United States Patent [19]

Tahara

[11] Patent Number: 5,412,428
[45] Date of Patent: May 2, 1995

[54] ENCODING METHOD AND DECODING METHOD OF COLOR SIGNAL COMPONENT OF PICTURE SIGNAL HAVING PLURALITY RESOLUTIONS

[75] Inventor: Katsumi Tahara, Kanagawa, Japan

[73] Assignee: Sony Corporation, Tokyo, Japan

[21] Appl. No.: 163,759

[22] Filed: Dec. 9, 1993

[30] Foreign Application Priority Data

Dec. 28, 1992 [JP] Japan .................................. 4-360170

[51] Int. Cl.⁶ ............................................. H04N 11/04
[52] U.S. Cl. ..................................... 348/396; 348/395
[58] Field of Search ............... 348/395, 402, 397, 398, 348/400, 396, 393; H04N 11/04, 7/13

[56] References Cited

U.S. PATENT DOCUMENTS

| | | | |
|---|---|---|---|
| 5,148,272 | 9/1992 | Acampora et al. ................ | 348/397 |
| 5,253,056 | 10/1993 | Puri et al. ........................ | 348/409 X |
| 5,262,864 | 11/1993 | Ng ................................... | 348/416 |
| 5,294,974 | 3/1994 | Naimpally et al. ................. | 348/398 |

OTHER PUBLICATIONS

Coded Representation of Picture and Audio Information, pp. 127–134, authored by ISO, referred to as ISO-IEC/JTC1/SC29/WG11 N0328, (AVC-400), published on Nov. 25, 1992.
Coded Representation of Picture and Audio Information, pp. 89–90, authored by ISO, referred to as ISO-IEC/JTC1/SC29/WG11 N0400, (AVD-491b), published on Apr. 1993.
Information Technology, Generic Coding of Moving Pictures and Associated Audio, Recommendation H.262, ISO/IEC 13818-2, Committee Draft, pp. 83–90, authored by ISO, referred to as ISO/IEC JTC1/SC29, WG11/602, published Nov. 5, 1993.

*Primary Examiner*—Victor R. Kostak
*Attorney, Agent, or Firm*—William S. Frommer; Alvin Sinderbrand

[57] ABSTRACT

In an encoding and decoding method of color signal components of picture signals having a plurality of resolutions, an encoding system and a decoding system can be obtained color pictures with higher definition, so that color difference signals in a format of the macroblock of 4:4:4 are encoded by a circuit 102. These color difference signals with the highest definition are down-sampled by a down sampling circuit 103 and then encoded by a circuit 101. These color difference signals with intermediate definition are further down-sampled by a down sampling circuit 104 to produce the color difference signals with the lowest definition. These color difference signals in a format of the macroblock of 4:2:0 are supplied to and encoded by a circuit 100. Data output from the circuits 100, 101, and 102 are composed by a combining circuit 105 and transmitted.

25 Claims, 20 Drawing Sheets

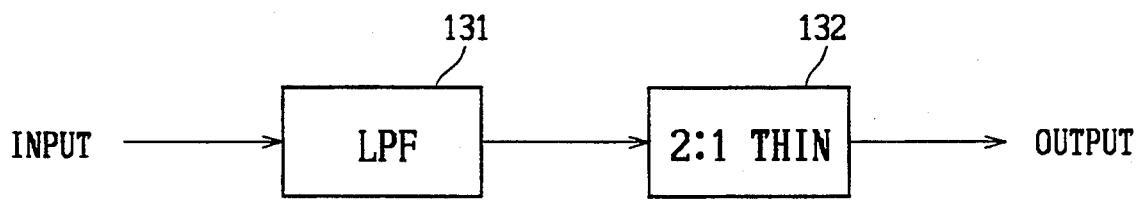
FIG. 8
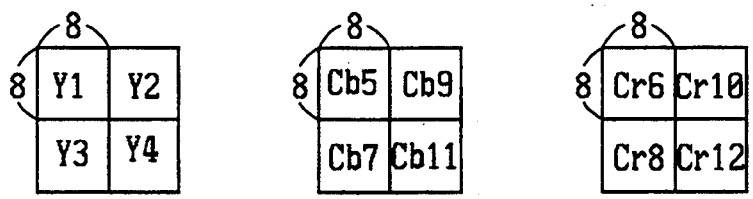
4:4:4 MACROBLOCK
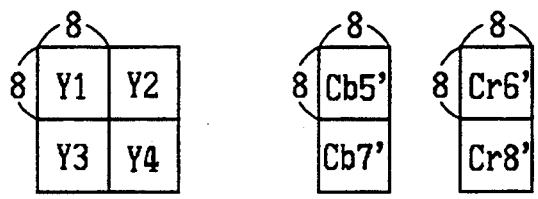
4:2:2 MACROBLOCK
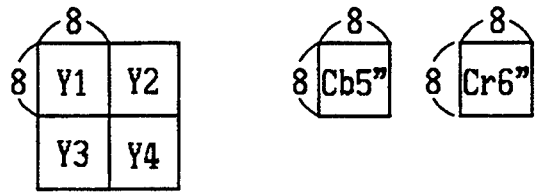
4:2:0 MACROBLOCK

FIG. 13A FRAME DCT MODE

FIG. 13B FIELD DCT MODE

1:2 INTERPOLATING

ENCODING METHOD AND DECODING METHOD OF COLOR SIGNAL COMPONENT OF PICTURE SIGNAL HAVING PLURALITY RESOLUTIONS

BACKGROUND OF THE INVENTION

FIELD OF THE INVENTION

The present invention relates to methods and systems for encoding and decoding picture signals and related picture signal recording media, and more particularly, relates to such methods and systems suitable for use in compressing high definition television signals (HDTV signals) and recording the compressed HDTV signals in a recording medium, such as an optical disc, magneto-optical disc or a magnetic tape, reproducing the recorded compressed HDTV signals, expanding the reproduced compressed HDTV signals to restore the normal range, and displaying the restored HDTV signals.

FIG. 1 shows a conventional picture signal encoder and a conventional picture signal decoder by way of example. The picture signal encoder includes a preprocessing circuit 1 which separates a luminance signal (Y signal) and a color difference signal (C signal) of an input video signal VD1, such as an HDTV signal. An analog-to-digital (A/D) converter 2 converts the luminance data into a corresponding digital luminance signal and stores the digital luminance signal temporarily in a frame memory 4. An A/D converter 3 converts the color difference data into a corresponding digital color difference signal and stores the digital color difference data temporarily in a frame memory 5. A format conversion circuit 6 converts the digital luminance data and the digital color difference data in frame format stored in the frame memories 4 and 5 into corresponding luminance data and color difference data in a block format, and provides the luminance data and the color difference data in block format to an encoder 7. The encoder 7 encodes the input data and supplies a bit stream representing the coded input signals to a recording medium 8, such as an optical disc, a magneto-optical disc, or a magnetic tape for recording.

A decoder 9 decodes the data reproduced from the recording medium 8 in a bit stream. A format conversion circuit 10 converts the decoded data in block format provided by the decoder 9 into corresponding decoded data in frame format. Luminance data and color difference data provided by the format conversion circuit 10 are stored respectively in frame memories 11 and 12. The luminance data and the color difference data read from the frame memories 11 and 12 are converted into an analog luminance signal and an analog color difference signal, respectively, by digital-to-analog (D/A) converters 13 and 14. A post processing circuit 15 combines the analog luminance signal and the analog color difference signal to provide an output video signal VD2 to an external circuit, not shown for purposes of simplicity and clarity.

As shown in FIG. 2, picture data representing a picture of one frame is depicted therein consisting of V lines each of H dots per inch which is sliced into N slices, i.e., a slice 1 to a slice N, each of, for example, sixteen lines, and each slice includes M macroblocks. Each macroblock comprises data blocks Y[1] to Y[4] including the luminance data of a group of 8×8 pixels, and data blocks Cb[5] and Cr[6] including color difference data corresponding to all the pixel data (16×6 pixels) of the data blocks Y[1] to Y[4].

Thus, each macroblock includes the luminance data Y[1] to Y[4] of the 16×16 pixel area arranged along the horizontal and vertical scanning directions as an unit for the luminance signal. The two color difference signals are time-base multiplexed after data compression and the color difference data for the 16×16 pixel area is allocated to the blocks Cb[5] and Cr[6] each having 8×8 pixels to process one unit. The picture data represented by the macroblocks are arranged successively in the slice, and the picture data represented by the blocks (8×8 pixels) are arranged successively in a raster scanning sequence in the macroblock (16×16 pixels).

The luminance data Y[1] to Y[4] and the color difference data Cb[5] and Cr[6] are transmitted in that order. The numerals in the reference characters denoting the data indicate the data's turn for transmission.

The encoder 7 compresses the received picture data and supplies the compressed picture data to the recording medium 8. The decoder 9 expands the compressed data received thereby and provides the expanded picture data to the format conversion circuit 10. The quantity of the data to be recorded in the recording medium 8 can be reduced by compression based on the line correlation and/or inter-frame correlation properties of picture signals. The line correlation property enables compression of the picture signal by, for example, discrete cosine transform (DCT).

Inter-frame correlation enables further compression of the picture signal. For example, suppose that frame pictures PC1, PC2, and PC3 are produced respectively at times $t_1$, $t_2$, and $t_3$ as shown in FIG. 3. The differences between picture signals respectively representing the frame pictures PC1 and PC2 are calculated to produce a frame picture PC12, and the differences between the frame pictures PC2 and PC3 are calculated to produce a frame picture PC23. Since the differences between successive frame pictures, in general, are not very large, a signal representing such differences is small. The difference signal is coded to further reduce the quantity of data.

As shown in FIGS. 4A and 4B, a group of pictures including picture signals representing frames F1 to F17 is processed as an unit wherein each frame is encoded either as an "I picture", a "P picture" or a "B picture", as explained below. More specifically, the picture signal representing the head frame F1 is coded as an I picture, the picture signal representing the second frame F2 is coded as a B picture and the picture signal representing the third frame F3 is coded as a P picture. The picture signals representing the fourth frame F4 to the seventeenth frame F17 are coded alternately as B pictures and P pictures.

The picture signal representing the I picture is obtained by coding the picture signal representing the corresponding frame (intra-frame encoding). Basically, the picture signal representing the P picture is encoded selectively by choosing one of two modes; either of which is selected to encode each macroblock depending on which mode provides greatest efficiency. The two modes available for encoding the macroblocks of each P picture include (1) intra-frame encoding and (2) an inter-frame encoding technique in which the differences between the picture signal representing the corresponding frame and the picture signal representing the preceding I picture or P picture are encoded as shown in FIG. 4A. The picture signal representing the B picture is obtained by selectively encoding each macroblock using the most efficient one of (1) intra-frame encoding, (2) inter-frame encoding and (3) a bidirectional encoding technique in which the differences between the picture signal representing the corresponding frame and the mean of the picture signals representing the preceding and succeeding frames are encoded as indicated in FIG. 4B.

FIG. 5 is a diagrammatic view to assist in explaining the principles of a method for coding a moving picture. As shown in FIG. 5, the first frame F1 is processed as an I picture to provide data F1X on a transmission line (intra-frame coding). The second frame F2 is processed as a B picture coded to provide transmission data F2X.

As indicated above, the macroblocks of the second frame F2 as a B picture can be processed in any of a plurality of processing modes. In the first (intra-frame) processing mode, the data representing the frame F2 is coded to provide the transmission data F2X (SP1), which is the same as the processing mode for processing the I picture. In a second (inter-frame) processing mode, the differences (SP2) between the frame F2 and the succeeding frame F3 are calculated and coded for transmission in a backward predictive coding mode. In a third (also inter-frame) processing mode, the difference (SP3) between the frame F2 and the preceding frame F1 are coded for transmission in a forward predictive coding mode. In a fourth (bidirectional-predictive) processing mode, the differences (SP4) between the frame F2 and the-mean of the preceding frame F1 and the succeeding frame F3 are calculated and coded to transmit transmission data F2X. That one of the these processing modes providing the least amount of data is employed for each macroblock.

For each macroblock, a motion vector x1 representing the motion of the picture of the objective frame (F1) for the calculation of the difference data (a motion vector between the frames F1 and F2) (forward prediction) or a motion vector x2 (a motion vector between the frames F3 and F2 for backward prediction) or the motion vectors x1 and x2 are transmitted (bilateral prediction).

Difference data (SP3) representing the differences between the frame F3 of the P picture and the preceding frame F1 as a predicted picture, and a motion vector x3 are calculated, and the difference data and the motion vector x3 are transmitted as transmission data F3X (forward predictive coding mode) or the picture data (SP1) of the frame F3 is transmitted as the transmission data F3X (inter-frame coding mode). Either the forward predictive coding mode or the inter-frame coding mode that will more effective on reducing the amount of data is employed.

On the other hand, in the ISO-IEC/JTC1/SC29/WG11, an encoding method and a decoding method related COMPATIBILITY AND SCALABILITY is now examined. Scalability is achieved by spatial reduction in the peland emporal domain. Compatibility is a specific implementation of the spatial scalability. These are described in detail, on pages 125 to 137 of "Document, AVC-400 (Test Model 3)", which is issued on November 1992, by the ISO-IEC/JTC1/SC29/WG11.

However, the COMPATIBILITY AND SCALABILITY related an encoding method and a decoding method of color difference signals has not been examined in the concrete.

SUMMARY OF THE INVENTION

In view of the foregoing, the first aspect of the present invention is to provide an encoding method and a decoding method for transmitting color signal components having a plurality of resolutions.

The second aspect of the present invention is to provide an encoding method and a decoding method for transmitting efficiently high definition color signal components.

Further, the third aspect of the present invention is to provide an encoding and/or decoding system for encoding and/or decoding either low definition color signal components and high definition color signal components with simple configuration.

Each of the foregoing and additional objects are achieved by the provision of the encoding method and decoding method of color signal components of picture signals having a plurality of resolutions.

In a picture signal encoding method of color signal components of picture signals of the present invention: a low definition color signal component is orthogonal transformed to produce a transform coefficient; the transform coefficient is quantized to produce a quantization coefficient; the quantization coefficient is variable-length coded to produce a first coding signal; the quantization coefficient is inverse-quantized to produce a inverse quantization coefficient; and by using the signal based on the above inverse quantization coefficient, a high definition color signal component is encoded to produce a second coding signal.

Further, in a picture signal decoding method of color signal components of coded picture signals of the present invention: coded low definition color signal component is variable-length decoded to produce a first variable length decoding signal; the first variable length decoding signal is inverse-quantized to produce a first inverse quantization coefficient; the coded high definition color signal component is variable-length decoded to produce a second variable length decoding signal; the second variable length decoding signal is inverse-quantized to produce a second inverse quantization coefficient; and by using the signal based on the above first inverse quantization coefficient and the above second inverse quantization coefficient, a high definition color signal component is decoded.

Further, a picture signal encoding system of color signal components of picture signals of the present invention, comprising: conversion means for orthogonal-transforming a low definition color signal component and producing a transform coefficient; quantization means for quantizing the conversion coefficient and producing a quantization coefficient; variable length encoding means for variable-length encoding the quantization coefficient and producing a first coding signal; inverse quantization means for inverse-quantizing the quantization coefficient and producing a inverse quantization coefficient; and encoding means for encoding a high definition color signal component and producing a second coding signal, by using the signal based on the above inverse quantization coefficient.

Further, a picture signal decoding system for decoding a color signal component of encoded picture signal of the present invention, comprising: variable length decoding means for variable-length decoding an encoded low definition color signal component and producing a first variable length decoding signal; inverse quantization means for inverse-quantizing the first variable length decoding signal and producing a first inverse quantization coefficient; variable length decoding means for variable-length decoding the encoded high definition color signal component and produce a second variable length decoding signal; inverse quantization means for inverse-quantizing the second variable length decoding signal and producing a second inverse quantization coefficient; and decoding means for decoding a high definition color signal component, by using the signal based on the above first inverse quantization coefficient and the above second inverse quantization coefficient.

Furthermore, a picture signal recording medium of the present invention is formed by that: a low definition color signal component is orthogonal-transformed to produce a transform coefficient; the quantization coefficient is variable-length coded to produce a first coding signal; the quantization coefficient is inverse-quantized to produce an inverse quantization coefficient; by using the signal based on the above inverse quantization coefficient, a high definition color signal component is encoded to provide a second coding signal; the first coding signal is recorded in a group the same as a luminance signal component; and the second coding signal is recorded in a group separated from the luminance signal component.

The above, and other objects, features and advantages of the present invention will be apparent in the following detailed description of preferred embodiments when read in conjunction with the accompanying drawings, in which like reference numerals are used to identify the same or similar parts in the several views.

BRIEF DESCRIPTION OF THE DRAWINGS

In the accompanying drawings:

FIG. 8 is a block diagram of an example of the configuration of down sampling circuits;

FIGS. 9A to 9C are schematic views of the configuration of macroblocks;

DETAILED DESCRIPTION OF THE INVENTION

Figure 1:
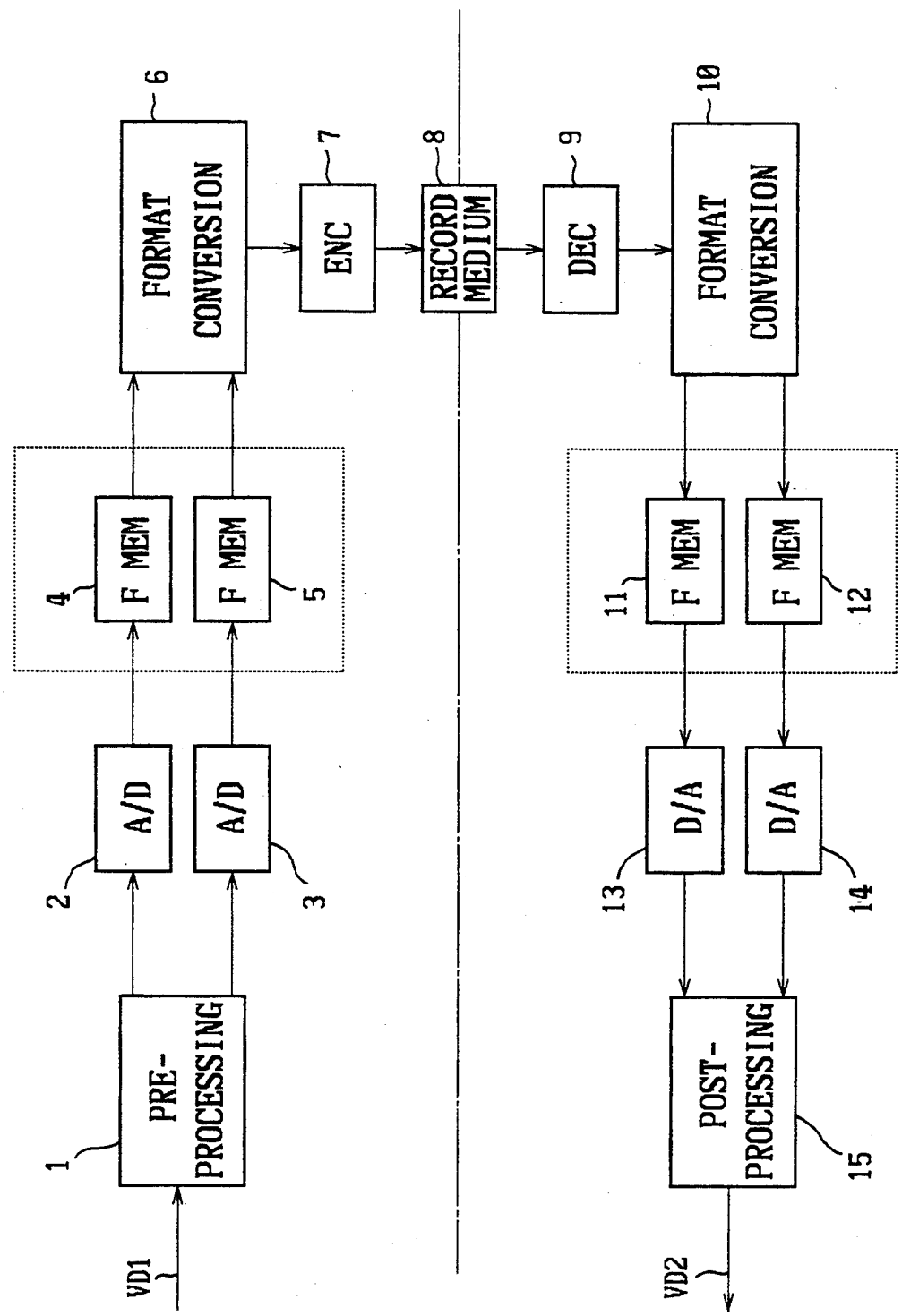
FIG. 1 is a block diagram of a conventional picture signal encoder and a conventional picture signal decoder.
Figure 2:
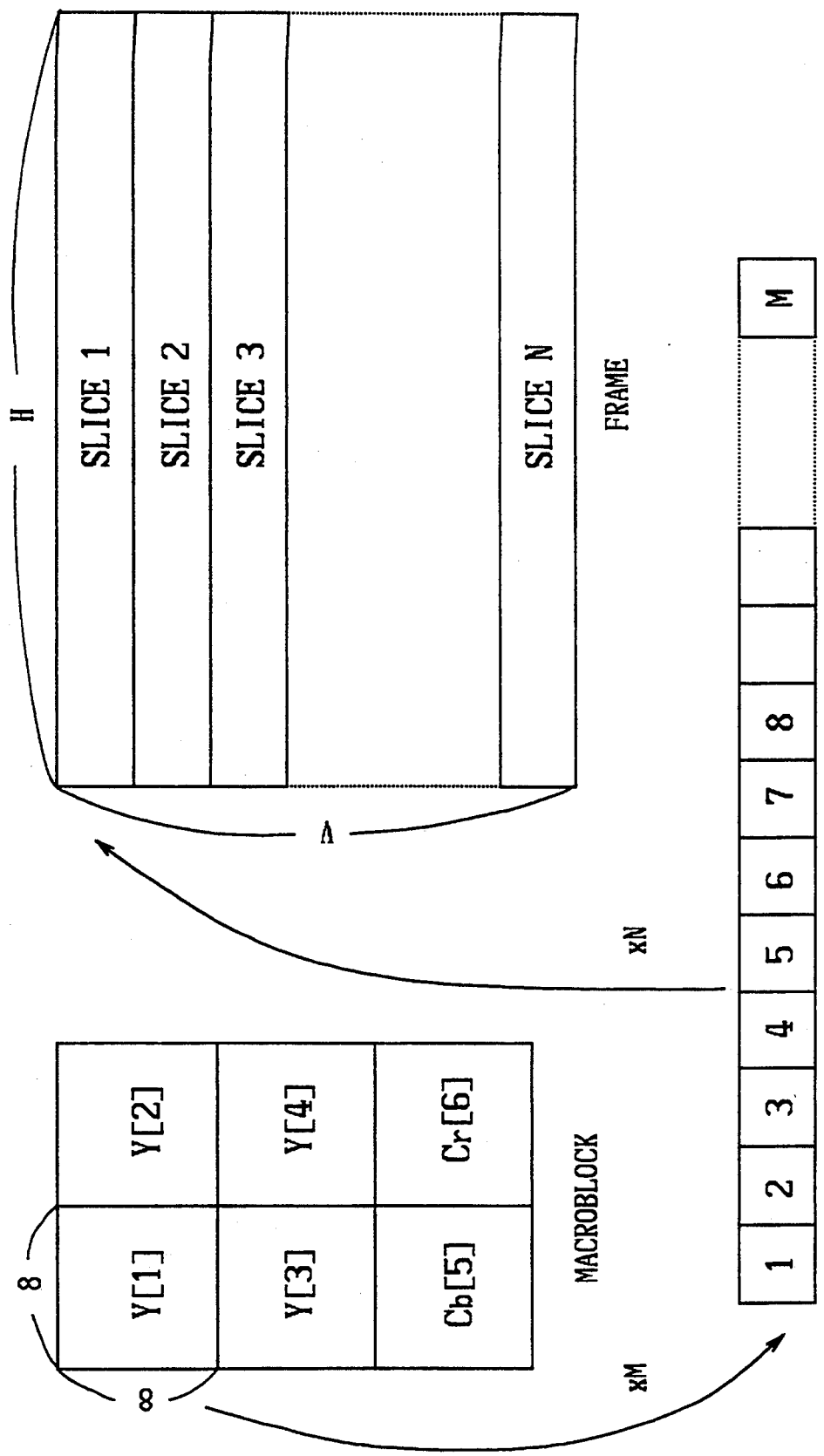
FIG. 2 is a schematic view for use in explaining an picture data transmission format.
Figure 3:
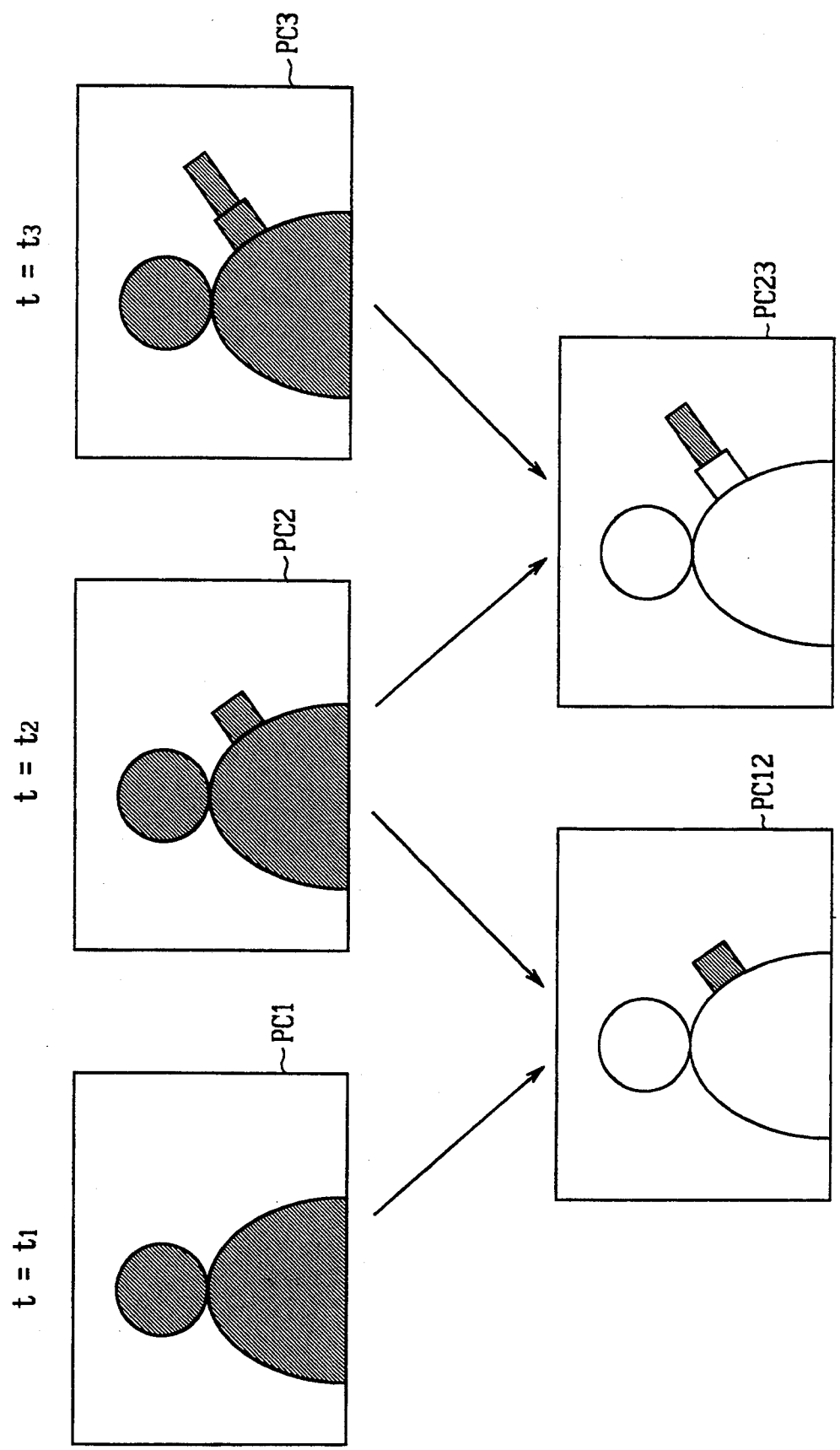
FIG. 3 is a schematic view of a sequence of frame pictures for use in explaining data compression by an inter-frame or field encoding technique.
Figure 6:
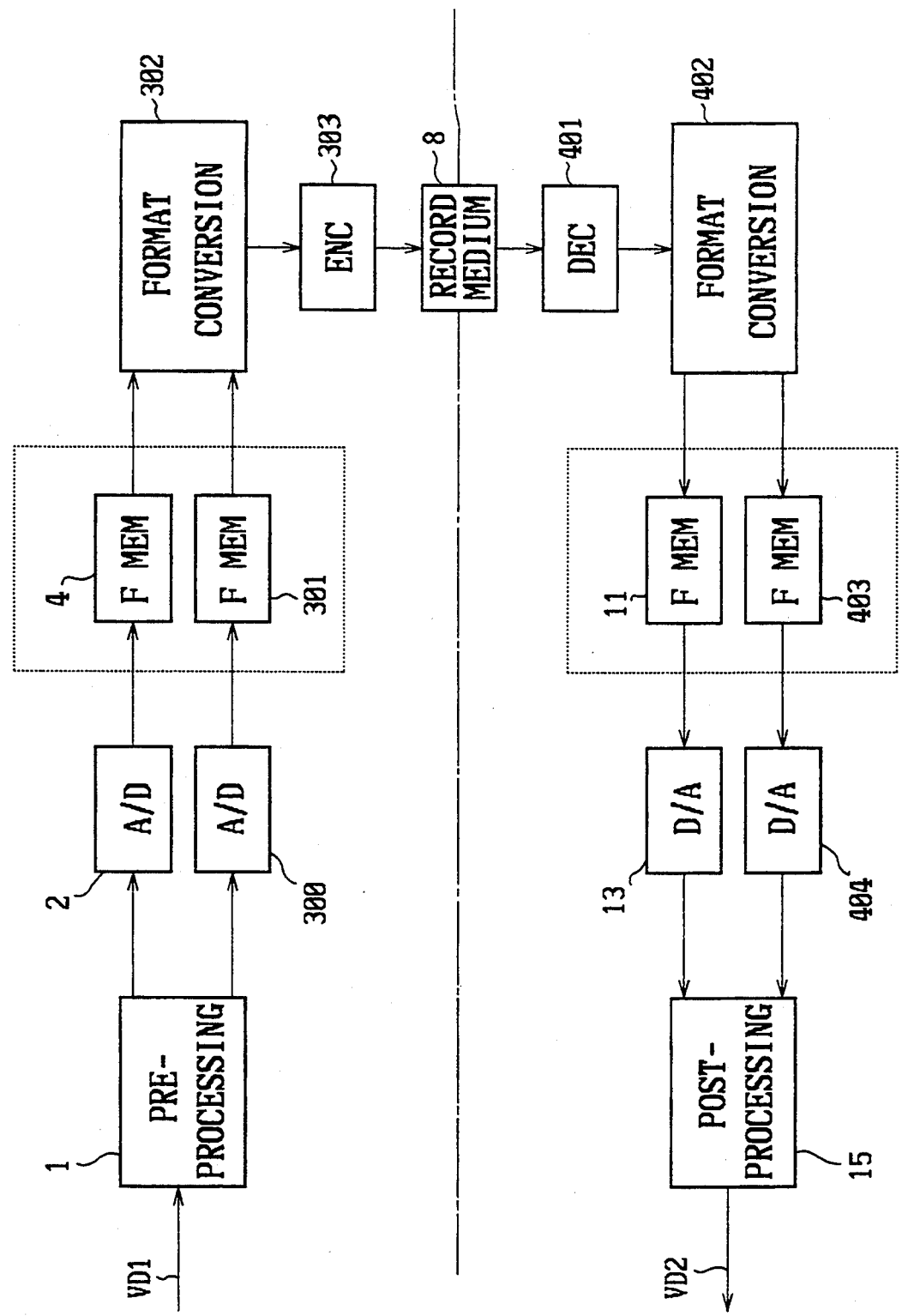
FIG. 6 is a block diagram of the configuration of an embodiment of a picture signal encoding system and a picture signal decoding system of the present invention.

Preferred embodiments of the present invention will be described with reference to the accompanying drawings:

FIG. 6 is a block diagram showing the entire configuration of picture signal encoding system and picture signal decoding system of the present invention, in which the components corresponding to those of the prior art devices shown in FIG. 1 are denoted by the same reference numerals. In this embodiment, an A/D converter 300 is different from an A/D converter 3 in FIG. 1 in timing of A/D conversion (sampling timing) of color difference signals output from a preprocessing circuit 1. As a result, a color difference signal frame memory 301, a format conversion circuit 302, and an encoder 303 all used for processing color difference signals output from the A/D converter 300 on the downstream side are different in their configuration from the corresponding parts in the prior art (FIG. 1).

Further, in the decoding system, a decoder 401, a format conversion circuit 402, a color difference signal frame memory 403, and a D/A converter 404 are different in their configuration respectively from a decoder 9, a format conversion circuit 10, a color difference signal frame memory 12, and a D/A converter 14 shown in FIG. 1.

The remaining configuration is the same as that shown in FIG. 1.

Figure 7:
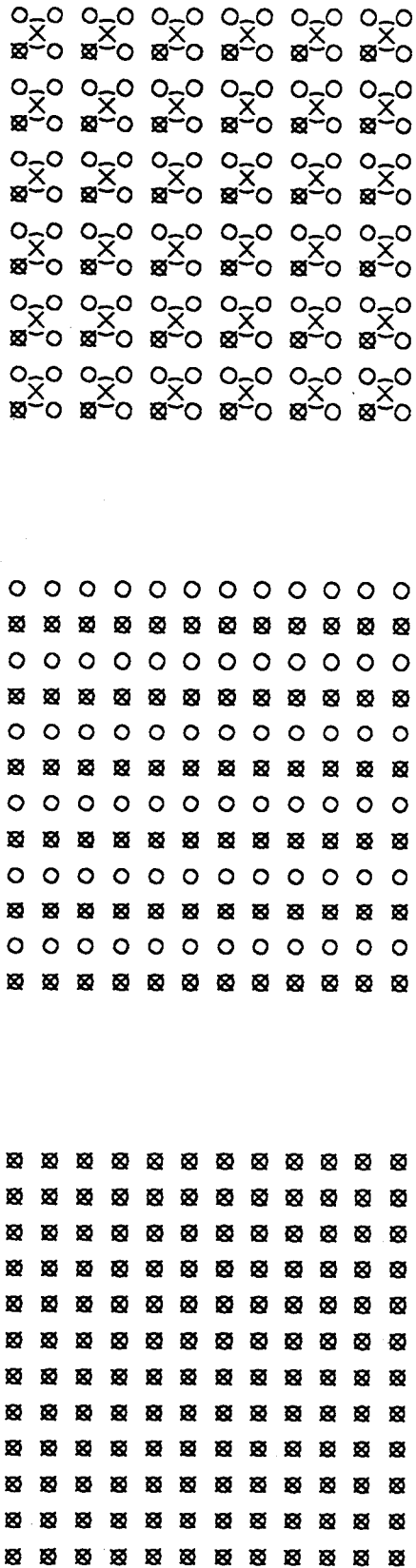
FIGS. 7A to 7C are schematic views for use in explaining a sampling format of color difference signals in the format conversion circuit 302 of FIG. 6.

In the A/D converter 300 of the present invention, sampling is executed as shown in FIG. 7A. More specifically, assuming that sampling points for the luminance signals in an A/D converter 2 are indicated by circle marks in the figure, sampling points for the color difference signals in the A/D converter 300 are set in 1:1 relation to the sampling points for the luminance signals (called 4:4:4 sub-sampling) as indicated by x marks.

The color difference signals sampled by the A/D converter 300 are supplied to and stored in the color difference signal frame memory 301. The color difference signals read out of the color difference signal frame memory 301 are supplied to the format conversion circuit 302 and subjected to down sampling.

More specifically, the format conversion circuit 302 incorporates a down sampling circuit as shown in FIG. 8, by way of example, so that the color difference signals sampled by the A/D converter 300 at the ratio of 4:4:4 are restricted by a low-pass filter 131 into a band of ½ frequency, and data of each line are thinned out at every other pixel by a thinning-out circuit 132. The color difference signals are thereby sampled at the ratio of 4:2:2, as shown in FIG. 7B. Thus, in this 4:2:2 subsampling, one color difference signal corresponds to two luminance signals in each line.

The format conversion circuit 302 further down-samples the color difference signals sampled at the ratio of 4:2:2 as mentioned above by the built-in down sampling circuit in a like manner, thereby producing the color difference signals sampled at the ratio of 4:2:0 as shown in FIG. 7C. In this case, the color difference signals resulted from the 4:2:2 sub-sampling are all thinned out ever other line and, therefore, one color difference signal corresponds to four luminance signals.

While the sampling ratio is changed in the above example by simply thinning out the data, it is also possible to execute sub-sampling by, for example, averaging the color difference signals at a plurality of predetermined positions. By averaging every four color difference signals shown in FIG. 7A, for example, the color difference signals indicated in FIG. 7C by "x" marks put in "()" can be obtained.

The format conversion circuit 302 converts the color difference signals, which are produced in the form of hierarchical signals having different resolutions as mentioned above, into the block structure along with the data of the corresponding luminance signals. As a result, three types of macroblocks of 4:4:4, 4:2:2, and 4:2:0 can be constructed as shown in FIGS. 9A to 9C.

The macroblock of 4:4:4 comprises, as shown in FIG. 9A, four luminance blocks Y1 to Y4, associated Cb color difference blocks Cb5, Cb9, Cb7, and Cb11, and associated Cr color difference blocks Cr6, Cr10, Cr8, and Cr12. In the macroblock of 4:2:2, as shown in FIG. 9B, luminance blocks are the same as those in the macroblock of 4:4:4 shown in FIG. 9A, but Cb color difference blocks are composed of Cb5' and Cb7' and Cr color difference blocks are composed of Cb6' and Cr8'. Further, in the macroblock of 4:2:0, as shown in FIG. 9C, luminance blocks are the same as those in the macroblock of 4:4:4, but a Cb color difference block is composed of Cb5" and a Cr color difference block is composed of Cb6".

Numerals affixed to the blocks represent the sequence of transmission in which the data in each macro block are transmitted. Also, the single quotation mark "'" indicates the data which has been subjected to down sampling, and the double quotation mark "''" indicates the data which has been subjected to down sampling two times. The block Cb5', for example, is not a block produced by directly down-sampling the block Cb5 (but a block produced by down-sampling the two blocks Cb5 and Cb9 as explained above).

The reason why the sequence of transmission of the color difference data in the macro block of 4:2:2 shown in FIG. 9B is set such that the block indicated by Cb7' is not transmitted subsequent to Cb5', is for making the transmission sequence correspond to that of the color difference data in the macroblock of 4:2:0 shown in FIG. 9C. Thus, in the macroblock shown in FIG. 9C, Cb6" is transmitted after Cb5". Accordingly, in the macroblock of 4:2:2 shown in FIG. 9B, too, the block indicated by Cr6' is transmitted after Cb5'.

Likewise, the sequence of transmission of data in the macroblock of 4:4:4 shown in FIG. 9A is also set corresponding to the sequence of transmission of data in the macroblock of 4:2:2 shown in FIG. 9B. By so setting the sequence of transmission of data, regardless of the ratio of the macroblock transmitted, the encoder can process the data by a common circuit.

In this embodiment, however, the above three types of macroblocks are not transmitted to the encoder 303 as they are. Transmitted to the encoder 303 are three kinds of data, i.e., the macroblock of 4:2:0 comprising the four luminance blocks Y1 to Y4 shown in FIG. 9C and the two color difference blocks Cb5" and Cr6", the color difference blocks Cb5' and Cb7', and the color difference blocks Cr6' and Cr8' among those blocks constituting the macroblock of 4:2:2 shown in FIG. 9B except the luminance blocks, as well as the color difference blocks Cb5, Cb7, Cb9, and Cb11 and the color difference blocks Cr6, Cr8, Cr10, and Cr12 in the macroblock of 4:4:4 shown in FIG. 9A except the luminance blocks.

Figure 10:
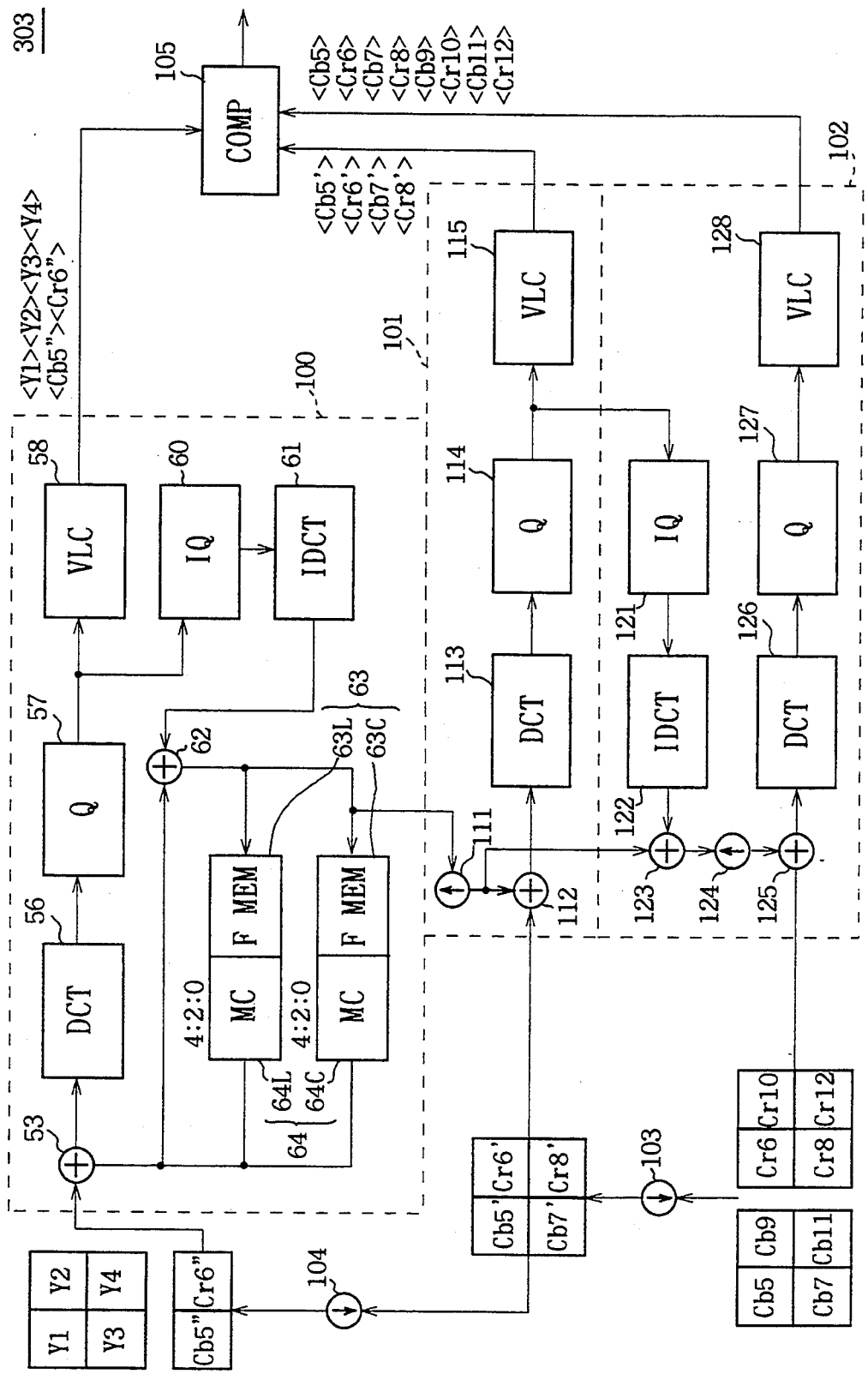
FIG. 10 is a block diagram of the configuration of a first embodiment of the encoder 303 in FIG. 6.

The encoder 303 is constructed, for example, as shown in FIG. 10. Note that, in FIG. 10, a motion vector detecting circuit 50, a frame memory 51, an estimate mode switching circuit 52, an estimate determining circuit 54, a DCT mode switching circuit 55, and a transmitting buffer 59, etc., are not shown for simplifying in comparison with FIG. 11, because of the simplification of explanation but they are similarly connected in the embodiment of FIG. 10 as well as FIG. 11.

Also, in the embodiment of FIG. 10, the frame memory 63 is shown as being divided into a luminance signal frame memory 63L and a color difference signal frame memory 63C, as well as the motion compensating circuit 64 is shown as being divided into a motion compensating circuit 64L and a motion compensating circuit 64C. On the contrary, those memories and circuits are each shown as one integral unit for simplifying in FIG. 11. Actually, the frame memory 63 and the motion compensating circuit 64 are respectively composed of two memories and circuits for luminance signals and color difference signals in the encoder of FIG. 11 also.

Figure 11:
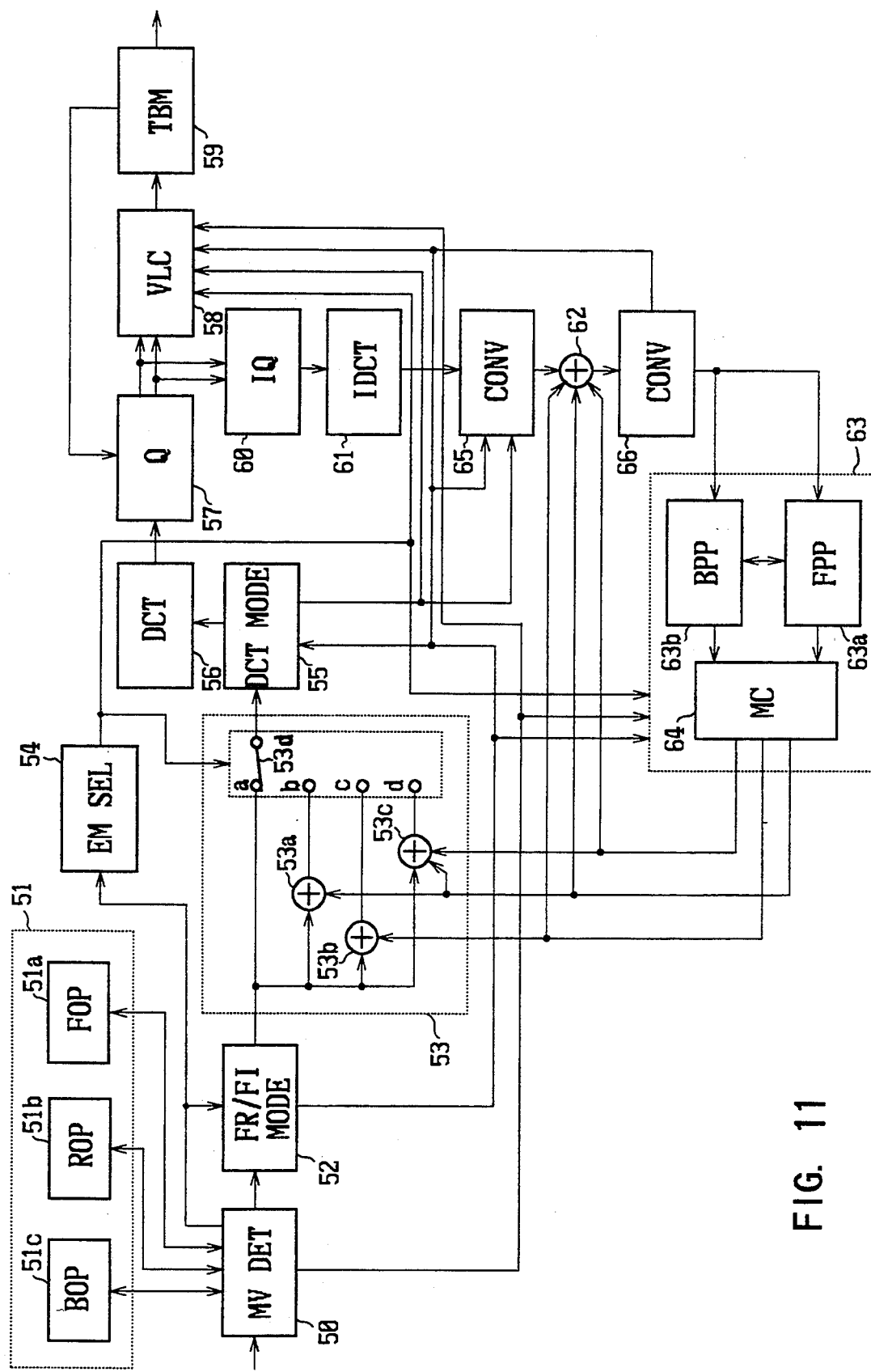
FIG. 11 is a block diagram of an example of the apparatus 100 in FIG. 10.

Further, in the embodiment of FIG. 10, each of the frame memory 63L for luminance signal and the frame memory 63C for color difference signal has inside a forward predictive picture memory portion and a backward predictive picture memory portion similarly to the frame memory in FIG. 11.

That is, in the embodiment shown in FIG. 10, a circuit 100 is composed of the motion vector detecting circuit 50 through the motion compensating circuit 64 is basically of the same configuration as the encoder of FIG. 11.

Therefore, it will be described a construction of the circuit 100 of FIG. 10, using corresponding construction of FIG. 11.

Figure 4A:
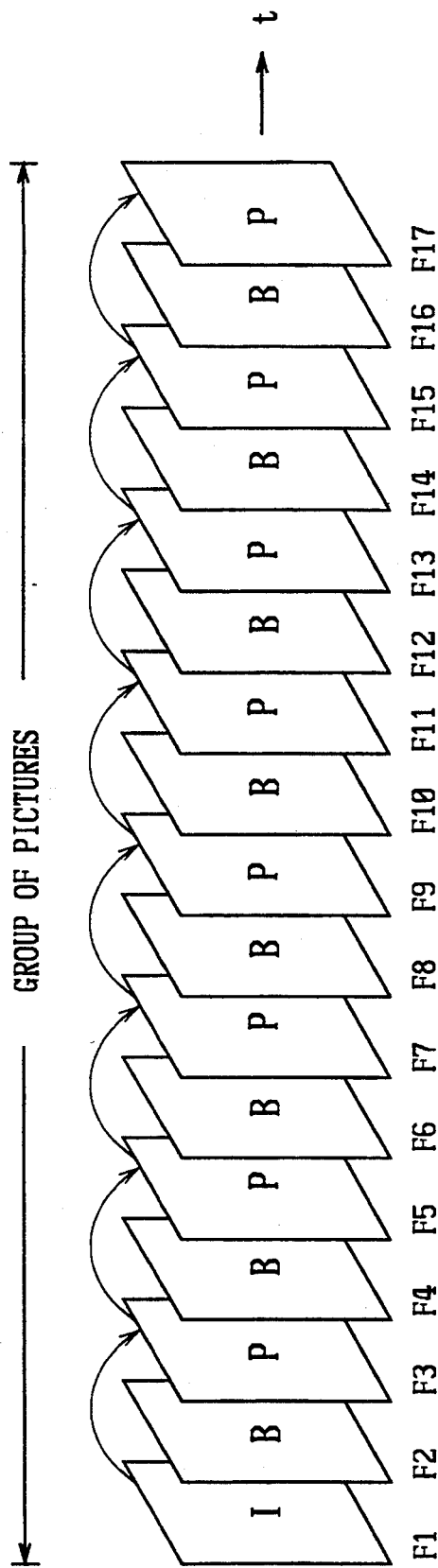
FIGS. 4A and 4B are schematic views of an encoding sequence for pictures transmitted in successive picture groups.
Figure 4B:
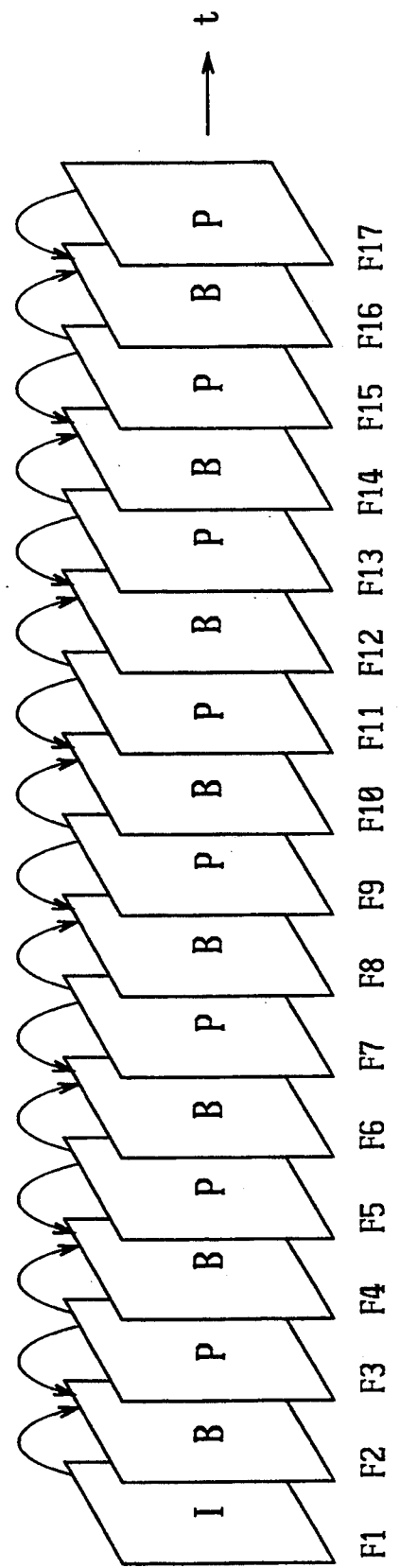
Figure 5:
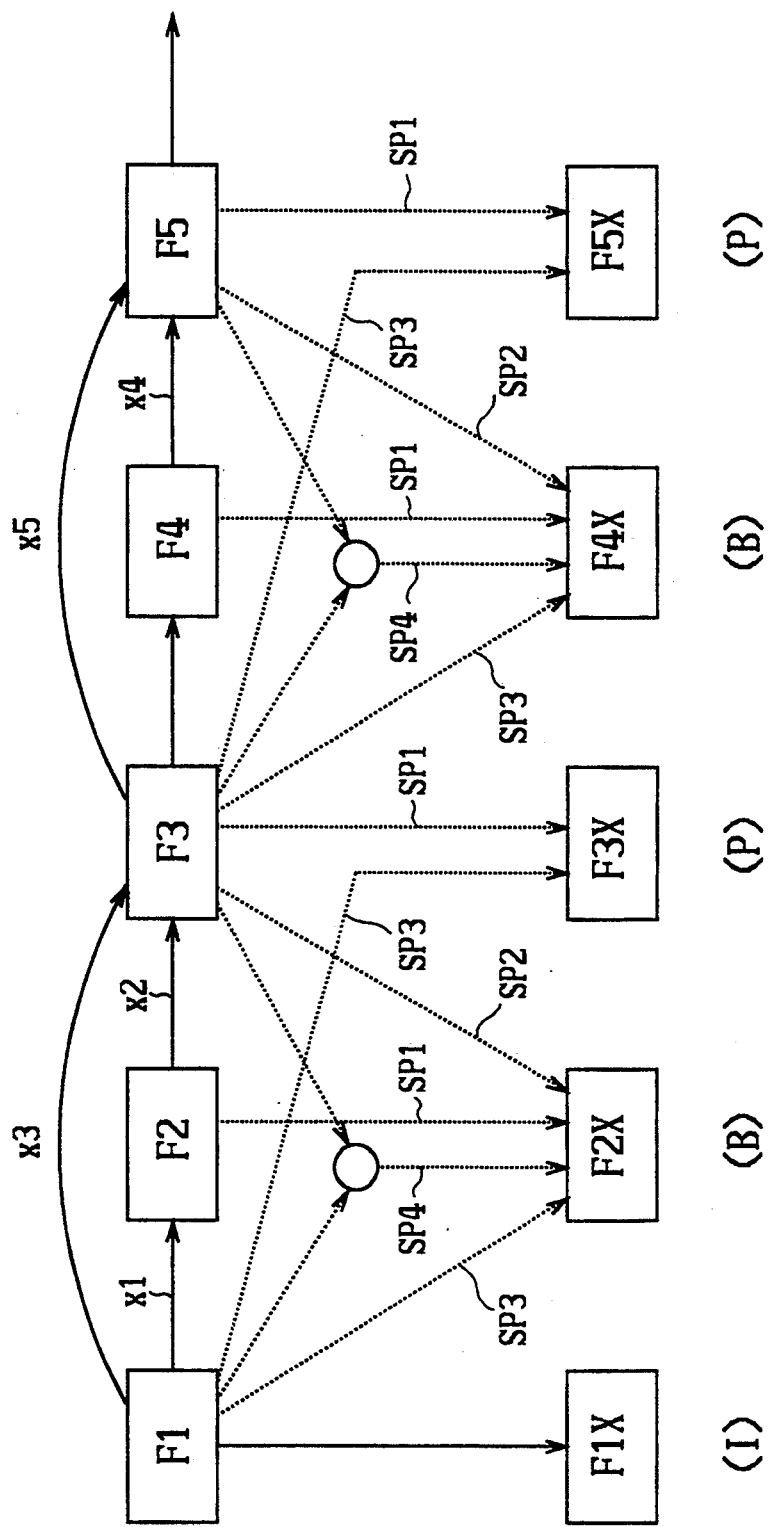
FIG. 5 is a schematic view for use in explaining I picture, P picture, and B picture encoding techniques.

Macroblocks of picture data to be coded are supplied to a motion vector detecting circuit 50 which processes the picture data of each frame as an I picture, a P picture, or a B picture according to a predetermined sequence. The mode of selection of an I picture, P picture, or a B picture in processing the picture data of the frames sequentially supplied to the motion vector detecting circuit 50 is determined beforehand. For example, in one sequence the group of frames F1 to F17 are processed as I pictures, P pictures and B pictures, respectively, as shown in FIGS. 4A and 4B.

The picture data of the frame to be processed as an I picture, for example, the frame F1, is transferred to and stored in a forward original picture (FOP) area 51a of a frame memory 51, the picture data of a frame to be processed as a B picture, for example, the frame F2, is transferred to and stored in reference original picture (ROP) area 51b of the frame memory 51, and the picture data of a frame to be processed as a P picture, for example, the frame F3, is transferred to and stored in a backward original picture (BOP) area 51c of the frame memory 51.

When the picture of a frame to be processed as a B picture (frame F4) or a P picture (frame F5) is provided in each cycle to the motion vector detecting circuit 50, the picture data of the first P picture (frame F3) stored in the backward original picture area 51c is transferred to the forward original picture area 51a, the picture data of the next B picture (frame F4) is stored (overwritten) in the reference original picture area 51b, the picture data of the next P picture (frame F5) is stored (overwritten) in the backward original picture area 51C. These operations are repeated sequentially.

The picture data of the pictures stored in the frame memory 51 are read therefrom, and then a frame/field mode switching circuit 52 processes the picture data in a frame encoding mode or a field encoding mode. An arithmetic unit (prediction circuit) 53 operates under control of an encoding mode selecting circuit 54 for intra-frame or field prediction, forward prediction, backward prediction, or bidirectional prediction. The selection of a predictive coding mode is dependent on a prediction error signal representing the difference between the objective reference original picture and the corresponding predicted picture. Accordingly, the motion vector detecting circuit 50 produces the sum of absolute values or the sum of squares of prediction error signals for use for the selection of the prediction mode.

The operation of the frame/field mode switching circuit 52 for selecting either the frame encoding mode or the field encoding mode will be described hereinafter.

Figure 12:
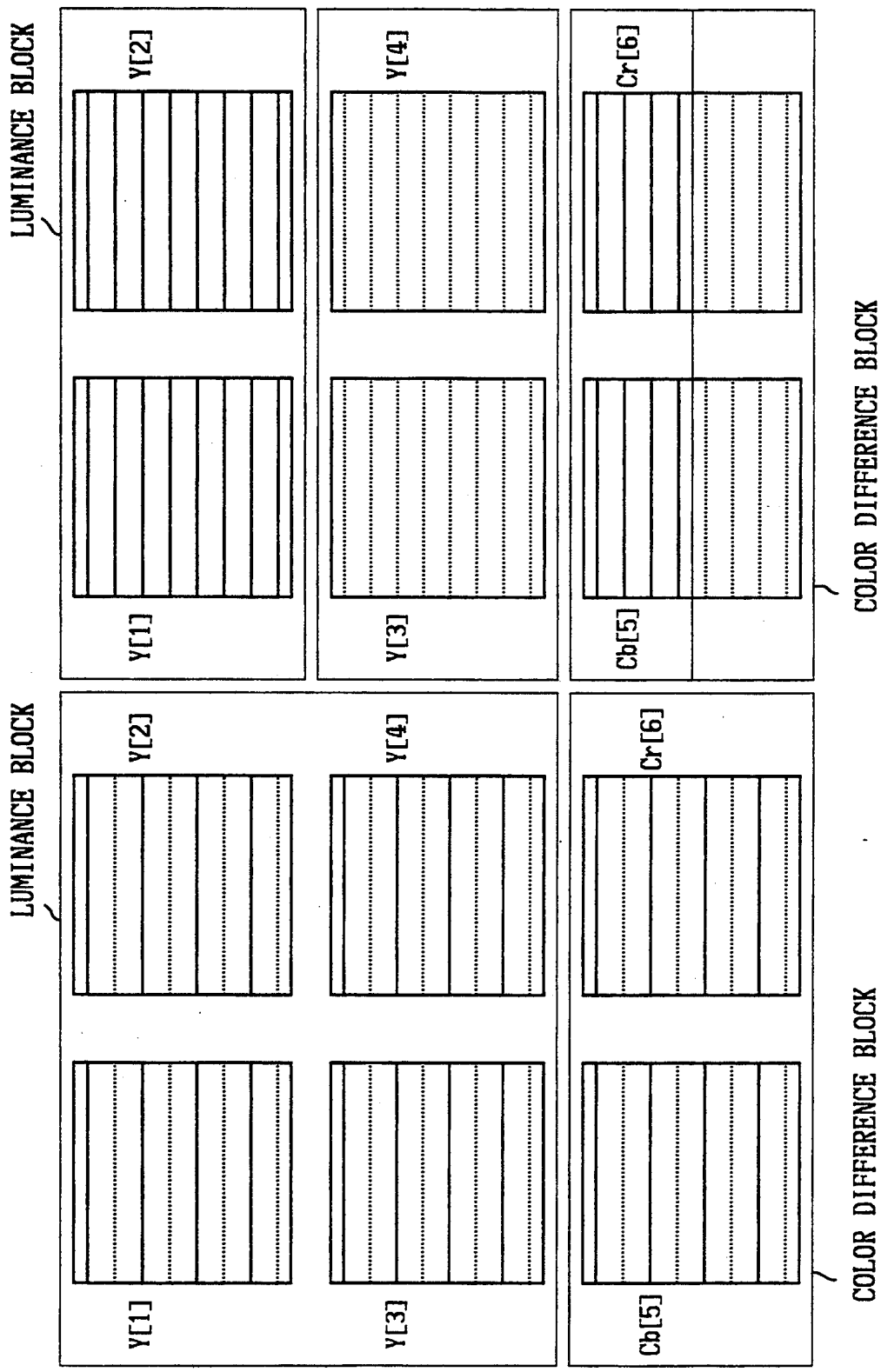
FIGS. 12A and 12B are schematic views of macroblock data arrangements in frame and field encoding modes, respectively.

When the frame encoding mode is selected, the circuit 52 transfers the four luminance blocks Y[1] to Y[4] given thereto from the motion vector detecting circuit 50 as they are to the arithmetic unit 53. In this case, as shown in FIG. 12A, each luminance block has, in combination, both the data representing the lines of odd fields indicated with solid lines and that representing the lines of even fields indicated with broken lines. In the frame encoding mode, the four luminance blocks forming each macroblock are processed as an unit, and a signal motion vector is determined for the four luminance blocks.

When the field encoding mode is selected, the circuit 52 changes the luminance blocks Y[1] and Y[2] from an arrangement as shown in FIG. 12A as received from the motion vector detecting circuit 50, for example, into pixels of lines of odd fields, changes the other luminance blocks Y[3] and Y[4] into pixels in lines of even fields as shown in FIG. 12B, and provides the arithmetic unit 53 with an output signal in the form as shown in FIG. 12B. In this case, an odd field motion vector corresponds to the two luminance blocks Y[1] and Y[2], while an even field motion vector corresponds to the other two luminance blocks Y[3] and Y[4].

The motion vector detecting circuit 50 provides the circuit 52 with signals representing the sum of absolute values of prediction errors for inter-frame and bidirectional predictive encoding, as well as a measure of the amount of data resulting from intra-frame encoding when operating in the frame encoding mode and similarly derived signals in the field encoding mode to the circuit 52. For simplicity, the foregoing data are referred to from time to time as prediction errors herein. The circuit 52 compares the sums of absolute values of prediction errors in the frame encoding mode and the field encoding mode, carries out a selection process corresponding to the mode having the small sum, and supplies the selected data to the arithmetic unit 53.

Practically, the process of arranging the data is carried out by the motion vector detecting circuit which supplies the data in an arrangement corresponding to the selected mode to the prediction mode switching circuit 52, and then the prediction mode switching circuit 52 provides the arithmetic unit 53 with the input signal as is.

In the frame encoding mode, the color difference signal having, in combination, both data representing the lines of the odd fields and data representing lines of the even fields as shown in FIG. 12A are given to the arithmetic unit 53. In the field encoding mode, the respective upper halves (four lines) of the color difference blocks Cb[5] and Cr[6] are rearranged to include a color difference signal representing odd fields corresponding to the luminance blocks Y[1] and Y[2], and the respective lower halves (four lines) of the color difference blocks Cb[5] and Cr[6] are rearranged to include a color difference signal representing even fields corresponding to the luminance blocks Y[3] and Y[4] as shown in FIG. 12B.

The motion vector detecting circuit 50 produces the sum of absolute values of prediction errors for use for determining a prediction mode for intra-frame encoding, forward prediction, backward prediction, and bidirectional prediction for each macroblock by means of the prediction mode selecting circuit 54.

The difference between the absolute value $|\Sigma Aij|$ of the sum $|Aij|$ of the signals Aij of a macroblock of a reference original picture and the sum $|\Sigma Aij|$ of the absolute values $|Aij|$ of the signals Aij of the macroblocks is calculated as the sum of absolute values of prediction errors for intra-frame encoding. The sum $\Sigma|Aij-Bij|$ of the absolute values $|Aij-Bij|$ of the differences (Aij-Bij) between the signals Aij of the macroblock of the reference original picture and the signals Bij of the macroblock of a predicted picture is calculated as the sum of absolute values of prediction errors for forward prediction. The sums of absolute values of prediction errors for backward prediction and bidirectional prediction are calculated in a similar manner, using predicted pictures different from that used for the calculation of the sum of absolute values of prediction errors for forward prediction.

These sums of absolute values are given to the prediction mode selecting circuit 54. The prediction mode selecting circuit 54 selects the smallest sum of absolute values of prediction errors among those given thereto as the sum of absolute value of prediction errors for inter-frame or field encoding, compares the smallest sum of absolute values of prediction errors and the sum of absolute values of prediction errors for intra-frame or field encoding, selects the smaller sum of absolute values of the prediction errors, and selects an encoding mode corresponding to the selected smaller sum of absolute values of prediction errors; that is, the intra-frame or field encoding mode is selected if the sum of absolute values of prediction errors for intra-frame or field encoding is smaller, and, to the extent that these predictive encoding modes may be used (depending on the type of picture encoded), the forward prediction mode, the backward prediction mode, or the bidirectional prediction mode corresponding to the smallest sum of absolute values of prediction errors is selected if the sum of absolute values of prediction errors for interframe or field encoding is smaller.

Thus, the motion vector detecting circuit 50 supplies the signals representing the macroblocks of the reference original picture and having an arrangement as in FIG. 12A or FIG. 12B corresponding to the prediction mode selected by the circuit 52, i.e., either the frame encoding mode or the field prediction mode, through the circuit 52 to the arithmetic circuit 53, detects a motion vector between a predicted picture corresponding to the encoding mode selected by the circuit 54 among those four modes and the reference original picture, and gives the detected motion vector to a variable-length coding (VLC) circuit 58 and a motion compensating circuit 64. As mentioned above, a motion vector that makes the corresponding sum of absolute values of prediction errors smallest is selected.

The prediction mode selecting circuit 54 sets an intraframe encoding mode, in which motion compensation is not performed, as an encoding mode while the motion vector detecting circuit 50 is reading the picture data of an I picture from the forward original picture area 51a, and connects the movable contact 53d of the switch of the arithmetic unit 53 to the fixed contact "a" thereof. Consequently, the picture data of the I picture is supplied to a DCT mode switching circuit 55.

Figure 13:
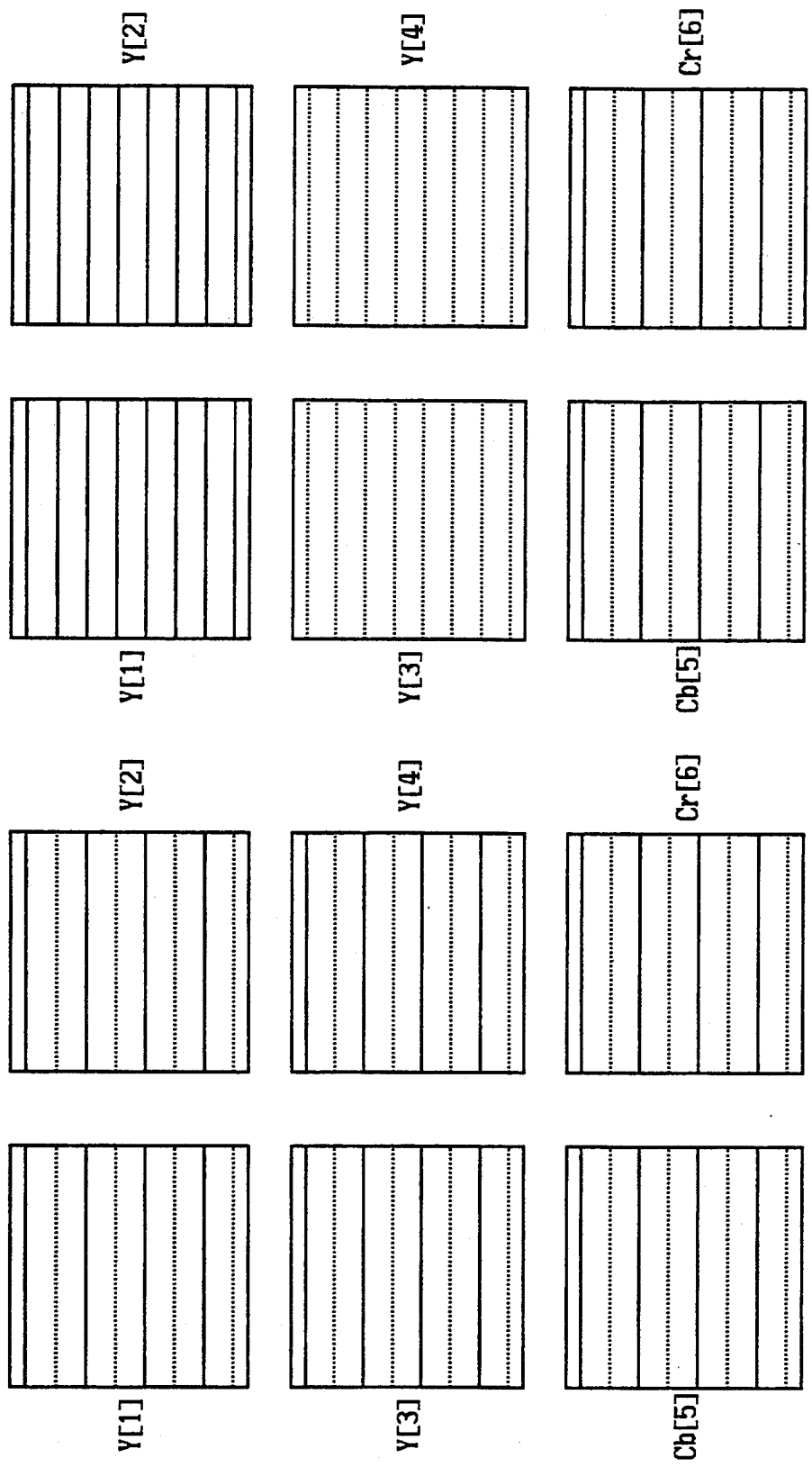
FIGS. 13A and 13B are schematic views of arrangements of the data in each macroblock in frame and field DCT modes, respectively.

The DCT mode switching circuit 55 provides data representing four luminance blocks having, in combination, lines of odd fields and those of even fields as shown in FIG. 11A (i.e., in a frame DCT mode) or data representing four luminance blocks each having lines of either an odd field or those of an even field as shown in FIG. 13B i.e., (in a field DCT mode) to a DCT circuit 56.

The DCT mode switching circuit 55 compares the coding efficiency of the frame DCT mode and that of the field DCT mode, and selects the DCT mode which provides better coding efficiency than the other by producing less data.

For example, the DCT mode switching circuit 55 produces a frame DCT mode data estimated by forming the data representing blocks having, in combination, lines of odd fields indicated by solid lines and those of even fields indicated by broken lines as shown in FIG. 13A, calculating the differences between signals representing the vertically adjacent lines of odd fields and even fields, and calculating the sum of absolute values of the differences (or the sum of squares of the differences). The circuit 55 also produces a field DCT mode data estimated by forming the data representing blocks of lines of odd fields and those of lines of even fields as shown in FIG. 13B, calculating the differences between the vertically adjacent lines of odd fields and those between the vertically adjacent lines of even fields, and calculating the sum of absolute values (or the sum of squares) of the former differences and the sum of absolute values (or the sum of squares) of the latter differences. The circuit 55 then compares the former and latter sums of absolute values, and selects a DCT mode corresponding to the smaller sum of absolute values; that is, the frame DCT mode is selected when the former sum of absolute value is smaller and the field DCT mode is selected when the latter sum of absolute value is smaller.

When the circuit 52 selects the frame encoding mode (FIG. 12A) and the DCT mode switching circuit 55 also selects the frame DCT mode (FIG. 13A), and as well as when the circuit 52 selects the field encoding mode (FIG. 12B) and the DCT mode switching circuit 55 also selects the field DCT mode (FIG. 13B), the DCT mode switching circuit 55 needs not to change the arrangement of the data.

When the circuit 52 selects the field encoding mode (FIG. 12B) and the DCT mode switching circuit 55 selects the frame DCT mode (FIG. 13A), and as well as when the circuit 52 selects the frame encoding mode (FIG. 12A) and the DCT mode switching circuit 55 selects the field DCT mode (FIG. 13B), the DCT mode switching circuit 55 rearranges the data. The circuit 52 provides a frame/field encoding flag indicating either the frame encoding mode or the field encoding mode to the DCT mode switching circuit 55 to instruct the DCT mode switching circuit 55 whether and how to rearrange the data.

The DCT mode switching circuit 55 provides data arranged according to the selected DCT mode to the DCT circuit 56 and supplies a DCT flag indicating the selected DCT mode to the variable-length coding circuit 58 and an inverse discrete cosine transform circuit (IDCT) 61.

The arrangement of the data in the luminance blocks are substantially the same in the frame and field modes as determined by the circuit 52 (FIGS. 12A and 12B), and the DCT mode switching circuit 55 (FIGS. 11A and 11B).

When the circuit 52 selects the frame encoding mode, in which the blocks have both odd lines and even lines in combination, it is highly probable that the DCT mode switching circuit 55 will select the frame DCT mode, in which each of the blocks has only odd lines and even lines in combination. When the prediction mode switching circuit 52 selects the frame prediction mode, in which each of the blocks has odd lines or even lines, it is highly probable that the DCT mode switching circuit 55 will select the field DCT mode, in which the data of odd fields and that of even fields are separated from each other.

However, the DCT mode switching circuit 55 does not always select either the frame DCT mode or the field DCT mode in such a manner since the prediction mode switching circuit 52 determines the mode so that the sum of absolute values of prediction errors is the smallest, while the DCT mode switching circuit 55 determines such the mode that coding can be achieved with high efficiency.

The DCT mode switching circuit 55 provides picture data representing an I picture to the DCT circuit 56 and the picture data is transformed into DCT coefficients by DCT (discrete cosine transforming). The DCT coefficients are quantized at a quantizing step based on the amount of data stored in a transmission buffer memory (TBM) 59 by a quantizing circuit 57, and the quantized DCT coefficients are supplied to the variable-length coding circuit 58.

The variable-length coding circuit 58 converts the picture data (in this case, the data of the I picture) received from the quantizing circuit 57 into variable-length codes, such as Huffman codes, according to the quantizing step size (scale) used for quantization by the quantizing circuit 57, and provides the variable-length codes to the transmission buffer memory 59.

The variable-length coding circuit 58 also variable length encodes the quantized data provided by the quantizing circuit 57, the encoding mode (intra-frame or field mode, forward prediction mode, backward prediction mode or bidirectional prediction mode) selected by the prediction mode selecting circuit 54, the motion vector determined by the motion vector detecting circuit 50, the frame/field encoding flag set by the circuit 52, and the DCT flag (frame DCT mode flag or field DCT mode flag) set by the DCT mode switching circuit 55 together with the zigzag scanned quantized data.

After storing the transmission data temporarily, the transmission buffer memory 59 sends out the transmission data in a bit stream at a constant bit rate and controls the quantizing step size by sending a quantization control signal corresponding to the amount of the residual data for each macroblock to the quantizing circuit 57. The transmission buffer memory 59 thus regulates the amount of data sent out in a bit stream in order to hold an appropriate amount of data (amount of data that will not cause overflow or underflow) therein.

For example, upon an increase in the amount of the residual data held in the transmission buffer memory 59 to an upper limit, the transmission buffer memory 59 provides a quantization control signal to increase the quantizing step size to be used by the quantizing circuit 57 so that the amount of quantized data produced by the quantizing circuit 57 will be decreased. Upon a decrease in the amount of the residual data held in the transmission buffer memory 59 to a lower limit, the transmission buffer memory 59 provides a quantization control signal to decrease the quantizing step size to be used by the quantizing circuit 57 so that the amount of quantized data produced by the quantizing circuit 57 will be increased.

The data of the I picture provided by the quantizing circuit 57 is inversely quantized by an inverse quantizing circuit 60 at a step provided by the quantizing circuit 57. The output of the inverse quantizing circuit 60 is subjected to IDCT (inverse DCT) in an inverse discrete cosine transform (IDCT) circuit 61, and the output of the IDCT circuit 61 is provided to the converting circuit 65. The converting circuit 65 converts the input data from the IDCT circuit 61 according to the DCT flag provided by the DCT mode switching circuit 55 and the frame/field encoding flag provided by the circuit 52 into the frame encoding mode format (FIG. 12A) or data of field encoding mode format (FIG. 12B) so that the converted data matches the predicted picture data provided by the motion compensating (MC) circuit 64, and then converted data is supplied to an adding circuit 62. Data provided by the adding circuit 62 is converted to the frame encoding mode format (FIG. 12A) according to the frame/field encoding flag by a conversion circuit 66, and then the converted data is stored in a forward predicted picture (FPP) area 63a of a frame memory 63.

The frame memory 63 may be replaced by a field memory. When a field memory is used instead of the frame memory 63, the output data of the adding circuit 62 is converted into the field encoding mode format (FIG. 12B) by the converting circuit 66, because the data of each field is stored separately.

When sequentially processing input frames as, for example, I, B, P, B, P, B, . . . , pictures, the motion vector detecting circuit 50 processes the picture data of the first input frame as an I picture, and then processes the picture data of the third input frame as a P picture before processing the picture data of the second input frame as a B picture, because the B picture requires backward prediction and the B picture cannot be decoded without using the P picture, i.e., to produce a backward predicted picture.

After processing the I picture, the motion vector detecting circuit 50 starts processing the picture data of the P picture stored in the backward original picture area 51c and, as mentioned above, the motion vector detecting circuit 50 supplies the sum of absolute values of the inter-frame differences (prediction errors), and the corresponding intra-frame value, for each macroblock to the circuit 52 and the prediction mode selecting circuit 54. The circuit 52 and the prediction mode selecting circuit 54 set a frame/field encoding mode for each macroblock as intra-frame or field encoding or forward prediction, according to the sum of absolute values of prediction errors (and the corresponding intra-frame value) for each macroblock of the P picture.

When the intra-frame encoding mode is set, the movable contact 53d of the circuit 53 is connected to the fixed contact "a". Consequently, the data, similarly to the data of the I picture, is provided through the DCT mode switching circuit 55, the DCT circuit 56, the quantizing circuit 57, the variable-length coding circuit 58 and the transmitting buffer memory 59 to a 'transmission line. The data is also supplied through the inverse quantizing circuit 60, the IDCT circuit 61, the converting circuit 65, the adding circuit 62 and the converting circuit 66 to the backward predicted picture area 63b of the frame memory 63 for storage.

When the forward prediction mode is set, the movable contact 53d of the arithmetic circuit 53 is connected to the fixed contact "b", and the motion compensating circuit 64 reads the data of the I picture from the forward predicted picture area 63a of the frame memory 63 and executes motion compensation according to a motion vector provided by the motion vector detecting circuit 50. When the prediction mode selecting circuit 54 selects the forward prediction mode, the motion compensating circuit 64 shifts the read address for a position corresponding to the macroblock being provided by the motion vector detecting circuit 50 in the forward predicted picture area 63a according to the motion vector, reads the data from the forward predicted picture area 63a and produces predicted picture data. The motion compensating circuit 64 arranges the predicted picture data in either the frame/field arrangement shown in FIG. 12A or 12B according to the frame/field encoding flag provided by the circuit 52.

The predicted picture data provided by the motion compensating circuit 64 is provided to a subtracting circuit 53a. The subtracting circuit 53 $a$ subtracts the predicted picture data of a macroblock given thereto by the motion compensating circuit 64 from the data of the corresponding macroblock of a reference original picture provided by the circuit 52, and provides difference or prediction error data representing the differences between the received data through the DCT mode switching circuit 55, the DCT circuit 56, the quantizing circuit 57, the variable-length coding circuit 58 and the transmitting buffer memory 59 to the transmission line. The difference data is locally decoded by the inverse quantizing circuit 60, the IDCT circuit 61 and the converting circuit 65, and the locally decoded difference data is supplied to the adding circuit 62.

The predicted picture data provided to the arithmetic unit 53 from motion compensating circuit 64 is supplied also to the adding circuit 62. The circuit 62 adds the predicted picture data provided by the motion compensating circuit 64 to the difference data provided by the converting circuit 65 to reproduce the picture data of the original (decoded) P picture. Since the picture data of the original P picture is in one of the arrangements shown in FIGS. 12A and 12B by the circuit 52, a converting circuit 66 rearranges the picture data according to the frame encoding mode as shown in FIG. 12A (or according to the field encoding mode shown in FIG. 12B when the memory 63 is instead a field memory) according to the frame/field encoding flag. The picture data of the P picture is stored in the backward predicted picture (BPP) area 63b of the frame memory 63.

After the picture data of the I picture and that of the P picture have been thus stored respectively in the forward predicted picture area 63a and the backward predicted picture area 63b, the motion vector detecting circuit 50 processes a B picture. The circuit 52 and the prediction mode selecting circuit 54 sets either the frame encoding mode or the field encoding mode as described above for each macroblock, and the circuit 54 sets the intra-frame encoding mode, the forward prediction mode, the backward prediction mode, or the bidirectional prediction mode.

As mentioned above, when the intra-frame mode or the forward prediction mode is set, the movable contact 53d is connected to the fixed contact "a" or "b", respectively, and then the same process as that carried out for the P picture is carried out and data is transmitted.

When the backward prediction mode or the bidirectional prediction mode is set, the movable contact 53d is connected to the fixed contact "c" or "d", respectively.

When the movable contact 53d is connected to the fixed contact "c" for the backward prediction mode, the picture data of P picture or I picture is read from the backward predicted picture area 63b, and the picture data is motion compensated by the circuit 64 according to a motion vector provided by the motion vector detecting circuit 50. When the backward prediction mode is set by the prediction mode selecting circuit 54, the motion compensating circuit 64 shifts the read address of the data in the backward predicted picture area 63b based on the motion vector from a position corresponding to the position of a macroblock being provided by the motion vector detecting circuit 50, reads the data, produces predicted picture data, and rearranges the data according the frame/field encoding to flag provided by the circuit 52.

The motion compensating circuit 64 supplies the predicted picture data to a subtracting circuit 53b. The circuit 53b subtracts the predicted picture data provided by the motion compensating circuit 64 from the data of the macroblock in the reference original picture provided by the circuit 52 to obtain difference data representing the differences between the picture data. The difference data is provided through the DCT mode switching circuit 55, the DCT circuit 56, the quantizing circuit 57, the variable-length coding circuit 58 and the transmitting buffer memory 59 to the transmission line.

When the movable contact 53d is connected to the fixed contact "d" in the bidirectional prediction mode, the I or P picture data is read from the forward predicted picture area 63a and the I or P picture data is read from the backward predicted picture area 63b, and then the data of each picture are motion compensated by the circuit 64 according to the motion vectors provided by the motion vector detecting circuit 50. When the prediction mode selecting circuit 54 sets the bidirectional prediction mode, the motion compensating circuit 64 shifts the read addresses in the forward predicted picture area 63a and the backward predicted picture area 63b from positions corresponding to the position of the macroblock being provided by the motion vector detecting circuit 50 according to two motion vectors for the forward predicted picture and the backward predicted picture, respectively, reads data from the forward predicted picture area 63a and the backward predicted picture area 63b, and produces predicted picture data. The predicted picture data is rearranged according to the flag provided by the circuit 52.

The motion compensating circuit 64 supplies the predicted picture data to a subtracting circuit 53c. The circuit 53c subtracts the mean of the predicted picture data provided by the motion compensating circuit 64 from the data of the macroblock of the reference original picture provided by the motion vector detecting circuit 50 to provide difference data through the DCT mode switching circuit 55, the DCT circuit 56, the quantizing circuit 57, the variable-length coding circuit 58, and the transmitting buffer memory 59 to the transmission line.

The picture of the B picture is not stored in the frame memory 63 because the same is not used for forming predicted pictures.

When necessary, the banks of the forward predicted picture area 63a and the backward predicted picture area 63b of the frame memory 63 can be changed to provide the stored data for producing a forward predicted picture and a backward predicted picture, respectively, of a specified reference original picture.

Although the encoder 7 has been explained as applied mainly to processing the luminance blocks, the macroblocks of the color difference blocks as shown in FIGS. 12A and 12B, 13A and 13B can be similarly processed and transmitted. A motion vector for processing the color difference block is one half the motion vector of the corresponding luminance block with respect to both the vertical direction and the horizontal direction.

Paying an attention to the color difference signals, the circuit 100 of FIG. 10 is to process those color difference signals having the lowest definition. In this embodiment, a circuit 101 composed of an up sampling circuit 111, a calculator 112, a DCT circuit 113, a quantizing circuit 114 and a variable-length coding circuit 115 is provided as a circuit for processing those color difference signals having higher definition than the color difference signals processed by the circuit 100. Further, a circuit 102 composed of an inverse quantizing circuit 121, an IDCT circuit 122, a calculator 123, an up sampling circuit 124, a calculator 125, a DCT circuit 126, a quantizing circuit 127 and a variable-length coding circuit 128 is provided as a circuit for processing those color difference signals having still higher definition than the color difference signals processed by the circuit 101.

The color difference signals having the highest definition are supplied to the circuit 102. The color difference signals which are resulted from down-sampling the color difference signals supplied to the circuit 102 by the down sampling circuit 103 and have lower definition, are supplied to the circuit 101. Further, the color difference signals which are resulted from down-sampling the color difference signals supplied to the circuit 101 by the down sampling circuit 104 once again and have the lowest definition, are supplied to the circuit 100.

The down sampling circuits 103 and 104 shown in FIG. 10 are incorporated in the format conversion circuit 302 shown in FIG. 6. The color difference blocks which are produced to constitute the macroblock of 4:4:4 and have the highest definition, are supplied to the circuit 102. The color difference blocks which are resulted from down-sampling the macroblock of 4:4:4 by the down sampling circuit 103 so as to constitute the macroblock of 4:2:2 are applied to the circuit 101. Then, the color difference blocks which are resulted from further down-sampling the color difference blocks constituting the macroblock of 4:2:2 by the down sampling circuit 104 so as to constitute the macroblock of 4:2:0 are supplied to the circuit 101 along with the luminance blocks in units of the macroblock of 4:2:0.

To additionally explain the sequence in which the luminance blocks and the color difference blocks in the circuit 100 are to be processed, since the luminance blocks Y1 to Y4 are first supplied sequentially, data of these blocks are written into the luminance block frame memory of the frame memory 51 as same as shown in FIG. 11 via the motion vector detecting circuit 50. Likewise, data of the color difference blocks are written into the color difference block frame memory of the frame memory 51 via the motion vector detecting circuit 50.

Then, the data of the luminance blocks Y1 to Y4 are read out of the frame memory 51 and processed through the encoding mode switching circuit 52, the arithmetic circuit 53, the quantizing circuit 57, the inverse quantizing circuit 60, the IDCT circuit 61, the calculator 62, the frame memory 63L, and the motion compensating circuit 64L, followed by outputting via the variable-length encoding circuit 58 and the transmitting buffer 59.

While the data of the color difference blocks are basically processed in a like manner to the data of the luminance blocks, the data of the color difference blocks output from the calculator 62 are supplied to and stored in the frame memory 63C. Also, motion compensation for the data of the color difference blocks is executed in the motion compensating circuit 64C by using the motion vector which is ½ of the motion vector for the corresponding luminance blocks Y1 to Y4 in each of the vertical and horizontal directions.

As a result, a group of signals consisting of the luminance blocks Y1, Y2, Y3, and Y4 and the color difference blocks Cb5″ and Cr6″ are supplied from the circuit 100 to a combining circuit 105.

On the other hand, the data of the color difference blocks converted by the down sampling circuit 103 into a format of the macroblock of 4:2:2 are supplied to the calculator 112 in the circuit 101. Also supplied to the calculator 112 are, as prediction error signals, the data obtained by up-sampling the data of the color difference blocks, which are output from the calculator 62 in the circuit 100 and have the lowest definition, two times (spatially) in the vertical direction by the up sampling circuit 111.

Figure 14:
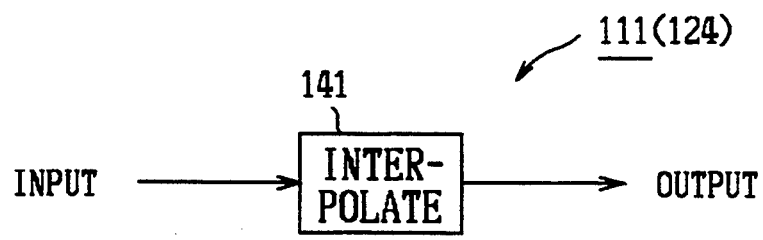
FIG. 14 is a block diagram of an example of the configuration of the up sampling circuits 111 and 124 of FIG. 10.
Figure 15:
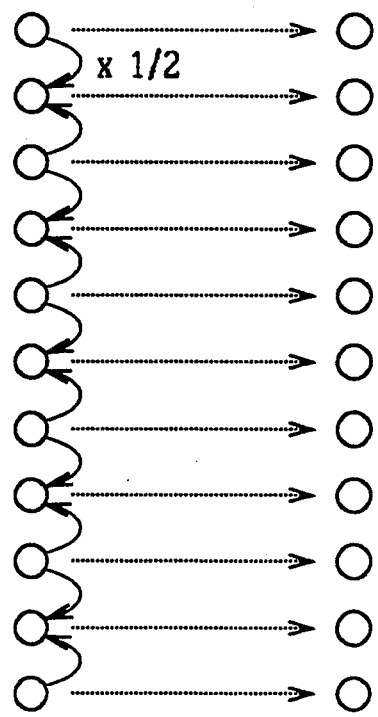
FIG. 15 is a schematic view for use in explaining the interpolating operation by the interpolation circuit 141 of FIG. 14.

The up sampling circuit 111 can be constituted by an interpolating circuit 141, for example, as shown in FIG. 14. The interpolating circuit 141 can produce the color difference data of those lines in which color difference data are absent, by reducing respective values of the color difference data of lines positioned above and below the relevant line to ½ and adding the halved values (i.e., averaging two values of the upper and lower color difference data), for example, as shown in FIG. 15. Since the frequency band is restricted upon the down sampling made by the down sampling circuit 104, the spatial frequency is not widened by the above up sampling, but definition can be increased two times.

The data of the color difference blocks thus produced by the up sampling circuit 111 are subtracted, as predictive picture signals, from the color difference data output from the down sampling circuit 103 to produce the differences therebetween. These differences include high-frequency components in the vertical direction because of up-sampling two times vertically by the up sampling circuit 111. The resulting output of the calculator 112 is subjected to the DCT process by the DCT circuit 113, then quantized by the quantizing circuit 114, and thereafter converted into variable-length codes by the variable-length coding circuit 115. Following that, the variable-length codes are supplied to the composing circuit 105 via the transmitting buffer (not shown). As a result, a group of signals consisting of the color difference blocks Cb5′, Cr6′, Cb7′, and Cr8′, which have higher definition than the color difference blocks Cb5″, Cr6″ output from the circuit 100, are produced.

Moreover, in the circuit 102, the data output from the quantizing circuit 114 in the circuit 101 are inverse quantized by the inverse quantizing circuit 121, then subjected to the IDCT process by the IDCT circuit 122, and thereafter output to the calculator 123. Also supplied to the calculator 123 are the predictive error signals output from the up sampling circuit 111 for use in the circuit 101. the calculator 123 adds the predictive error signals output from the up sampling circuit 111 and the signals output from the IDCT circuit 122, thereby locally decoding the color difference signals used in the circuit 101.

The signals output from the calculator 123 are up-sampled two times in the horizontal direction by the up sampling circuit 124 and then output to the calculator 125. The calculator 125 subtracts the signals output from the up sampling circuit 124, as predictive error signals, from the data of the color difference blocks in a format of the macro block of 4:4:4 supplied from the format conversion circuit 302. Accordingly, the resulting difference data includes high-frequency components in the horizontal direction.

The output of the calculator 125 is subjected to the DCT process by the DCT circuit 126, then quantized by the quantizing circuit 127, and thereafter converted into variable-length codes by the variable-length coding circuit 128. Following that, the variable-length codes are output to the composing circuit 105 via the transmitting buffer memory (not shown). As a result, a group of data consisting of the color difference blocks Cb5, Cr6, Cb7, Cr8, Cb9, Cr10, Cb11, and Cr12 with the highest definition are obtained.

The composing circuit 105 composes three groups of data, i.e., a group of data consisting of the luminance blocks Y1 to Y4 and the data of the color difference blocks Cb5″ and Cr6″ with the lowest definition output from the circuit 100, a group of data consisting of the data of the color difference blocks Cb5′, Cr6′, Cb7′, and Cr8′ with intermediate definition output from the circuit 101, and a group of data consisting of the data of the color difference blocks Cb5, Cr6, Cb7, Cr8, Cb9, Cr10, Cb11, and Cr12 with the highest definition output from the circuit 102.

Figure 16:
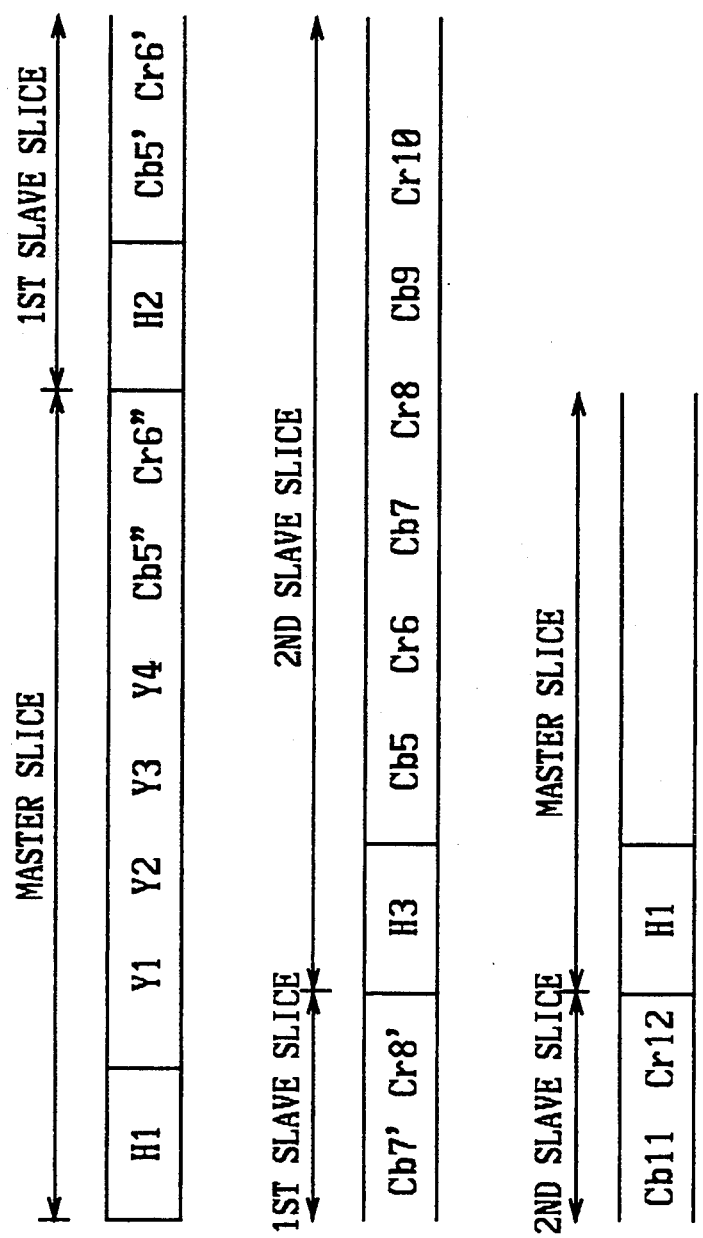
FIG. 16 is a diagram for use in explaining a recording format of the recording medium 8 of FIG. 6.

When composing those groups of data, the composing circuit 105 arranges headers H1 to H3 respectively at heads of the three groups of data, as shown in FIG. 16. A bit stream is thereby constituted which includes, as one unit, a master slice consisting of the header H1 and data Y1, Y2, Y3, Y4, Cb5'', and Cr6'', a first slave slice consisting of the header H2 and Cb5', Cr6', Cb7', and Cb8', and a second slave slice consisting of the header H3 and data Cb5, Cr6, Cb7, Cr8, Cb9, Cr10, Cb11, and Cr12. The bit stream is supplied to the transmission path and recorded in the recording medium 8.

It is theoretically possible to transmit the data of all master slices for one frame, then the data of all first slave slices for the same one frame, and then the data of all second slave slices for the same one frame. However, this transmission sequence would lead to difficulties in providing color pictures with high resolution in real time. It is therefore preferable to transmit the master slice, the first slave slice and the second slave slice in turns, as shown in FIG. 16.

The data recorded in the recording medium 8 following the format shown in FIG. 16 are reproduced from the recording medium 8 and input to the decoder 401 of the decoding device in FIG. 6.

Figure 17:
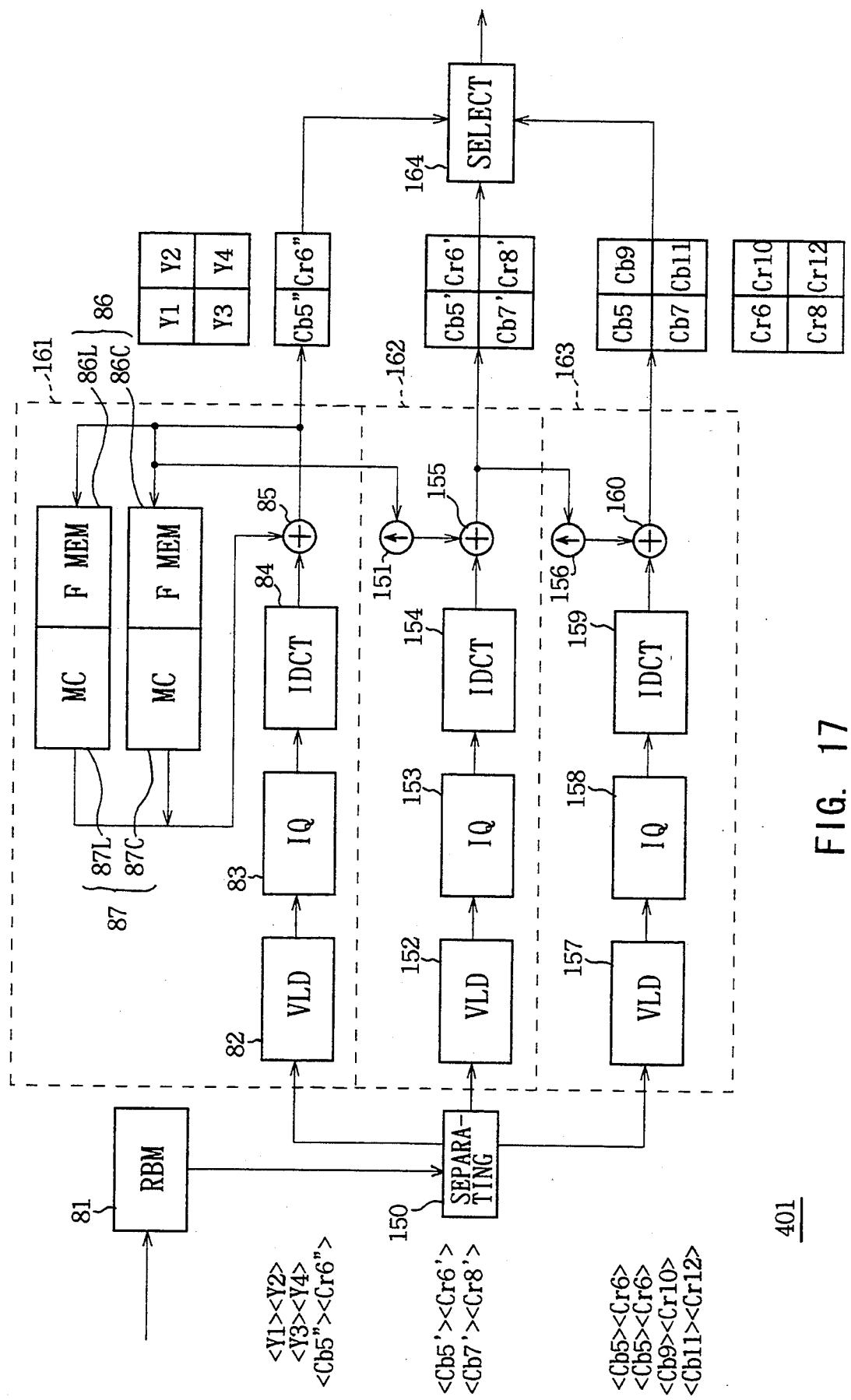
FIG. 17 is a block diagram of the configuration of a first embodiment of a decoder 401 of FIG. 6.

The decoder 401 is constituted, for example, as shown in FIG. 17. In the illustrated embodiment, the data supplied from the recording medium 8 (transmission path) are supplied to the receiving buffer memory (RBM) 81 to be temporarily stored therein, and then supplied to a separating circuit 150 for separation into the group of data consisting of the luminance blocks and the color difference blocks with the lowest definition, the group of data consisting of the color difference blocks with intermediate definition, and the group of data consisting of the color difference blocks with the highest definition. These three groups of data are supplied to circuits 161, 162, and 163, respectively.

Figure 18:
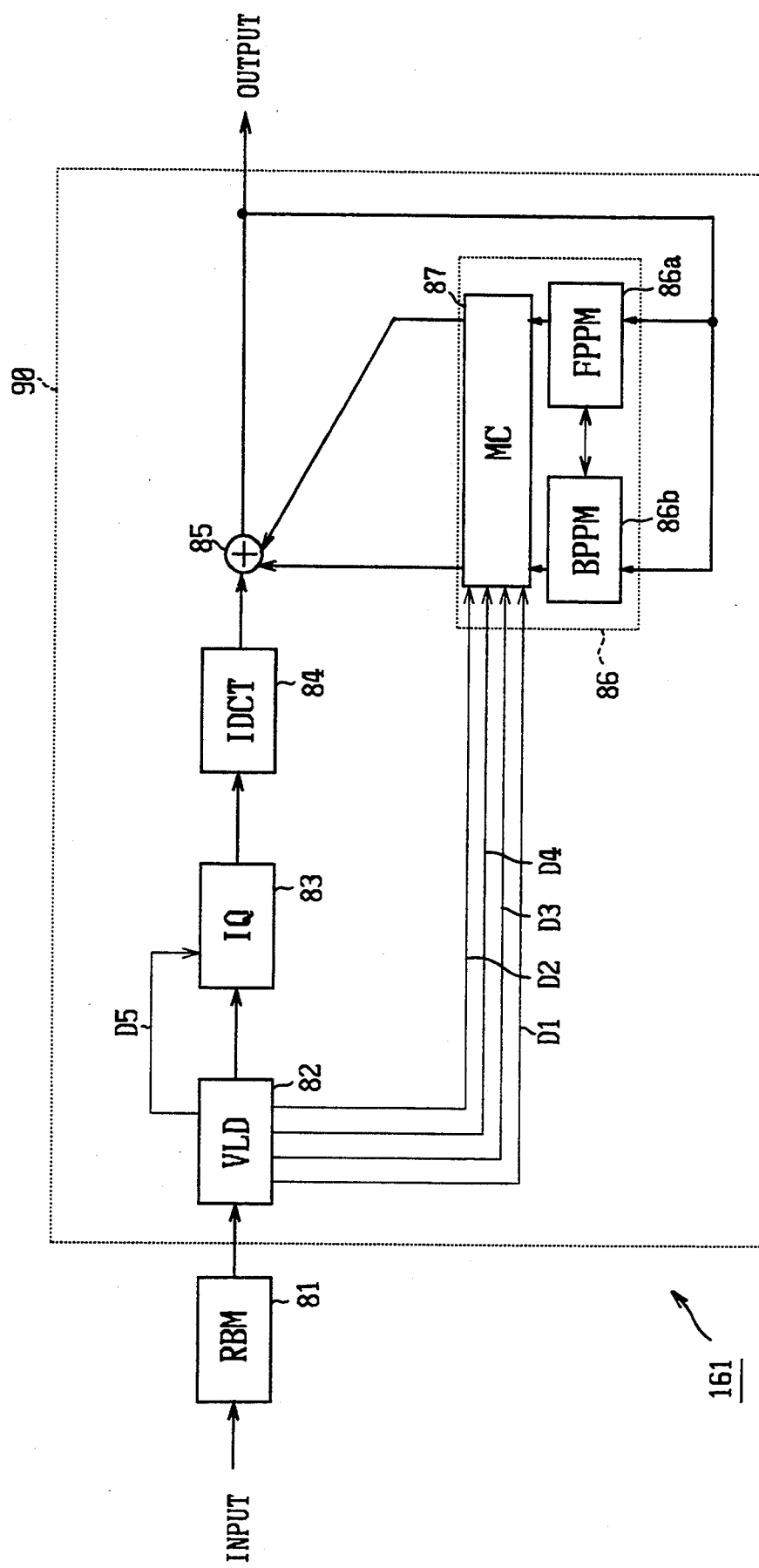
FIG. 18 is a block diagram of an example of the configuration of the decoder 161 of FIG. 17.

The circuit 161 is essentially of the same configuration as the decoding circuit 90 shown in FIG. 18. The circuit 161 is shown in FIG. 17 as including the frame memory 86 having a frame memory 86L for luminance signal and a frame memory 86C for color difference signal, and the motion compensating (MC) circuit 87 having into a motion compensating circuit 87L and a motion compensating circuit 87C. Though not shown, the decoding circuit of FIG. 18 also includes those two memories and two circuits. Further, though not shown, each of the frame memory 86L for luminance signal and the frame memory 86C for color difference signal in FIG. 17 has a forward predictive picture section and a rearward predictive picture section therein similarly to the frame memory 86 in FIG. 18.

The circuit 161 will be described by using FIG. 18. The encoded picture data transmitted via the transmission path (or the recording medium 8) are received by a receiving circuit (not shown) or reproduced by a reproducing device (not shown), temporarily stored in a recording buffer 81, and thereafter supplied to a variable-length decoding circuit 82 in a decoding circuit 90. The variable-length decoding circuit 82 executes variable-length decoding on the data supplied from the receiving buffer 81 to output the motion vector D1, the predictive mode D2, the predictive flag D3 and the DCT flag D4 to a motion compensating circuit 87, the quantizing step size D5 to the inverse quantizing circuit 83, and further the decoded picture data to the inverse quantizing circuit 83.

The inverse quantizing circuit 83 inverse quantizes the picture data supplied from the variable-length decoding (VLD) circuit 82 in accordance with the quantizing step size also supplied from the variable-length decoding circuit 82, and outputs the resulting data to an IDCT circuit 84. The data (DCT coefficients) output from the inverse quantizing circuit 83 are subjected to IDCT processing in the IDCT circuit 84 and are supplied to a calculator 85.

When the picture data supplied from the IDCT circuit 84 are data of the I picture, those data are directly output from the calculator 85 and are supplied to and stored in a forward predictive picture section memory (FPPM) 86a of a frame memory 86 for producing predictive picture data for the picture data (i.e., the data of the P or B picture) applied later to the calculator 85. Those data are also output to the format conversion circuit 32 (FIG. 6).

When the picture data supplied from the IDCT circuit 84 are the data of the P picture obtained by using the picture data of one frame before as predictive picture data and are the data resulted from the forward predictive mode, the picture data of one frame before (i.e., the data of the I picture) stored in the forward predictive picture memory section 86a of the frame memory 86 are read and applied to the motion compensating circuit 87 for motion compensation in accordance with the motion vector output from the variable length decoding circuit 82. The compensated data are added in the calculator 85 to the picture data (difference data) supplied from the IDCT circuit 84, followed by outputting therefrom. The added data, i.e., the decoded data of the P picture, are supplied to and stored in a backward predictive picture memory section (BPPM) 86b of the frame memory 86 for producing predictive picture data for the picture data (i.e., the data of the B or P picture) supplied later to the calculator 85.

When the supplied picture data are the data of the P picture but are resulted from the intra-frame or field predictive mode, those data are not particularly processed in the calculator 85 and are directly stored in the backward predictive picture memory section 86b, as with the data of the I picture.

Since the above P picture is a picture to be displayed subsequent to the next B picture, it is not yet output to the format conversion circuit 32 at this point in time (as mentioned above, the P picture input after the B picture is processed and transmitted prior to the B picture).

When the picture data supplied from the IDCT circuit 84 are the data of the B picture, the picture data of the I picture stored in the forward predictive picture memory section 86a of the frame memory 86 (in the forward predictive mode), the picture data of the P picture stored in the backward predictive picture memory section 86b thereof (in the backward predictive mode), or the picture data of both the pictures (in the bidirectional predictive mode) are read and supplied to the motion compensating circuit 87 for motion compensation in accordance with the motion vector(s) output from the variable length decoding circuit 82, thereby producing the predictive picture(s). However, when the motion compensation is not required (i.e., in the intra-picture predictive mode), no predictive picture is produced.

The data thus motion-compensated by the motion compensating circuit 87 are added in the calculator 85 to the output of the IDCT circuit 84. The added output is delivered to the format conversion circuit 32.

The above added output is the picture data of the B picture and will not be used for producing the predictive picture for any other picture; hence it is not stored in the frame memory 86.

After the picture data of the B picture have been output, the picture data of the P picture stored in the backward predictive picture memory section 86b are read and supplied to the calculator 85 via the motion compensating circuit 87. At this time, however, the motion compensating is not performed.

In FIG. 18 showing the decoder 31, there are not illustrated circuits corresponding to the predictive mode switching circuit 52 and the DCT mode switching circuit 55 in the encoder of FIG. 11. The process corresponding to those circuits, i.e., the process of returning the data structure in which signals of odd field lines and even field lines are separated to the original structure in which the signals are mixed, is executed by the motion compensating circuit 87.

While the above description has been made on processing of the luminance signals, the color difference signals are also processed in a like manner. Note that the motion vector for use in processing the color difference signals is ½ of the motion vector for the corresponding luminance signals in each of the vertical and horizontal directions.

Therefore, to explain only the relationship between the frame memory 86L for luminance signal and the frame memory 86C for color difference signal in the circuit 161 here, the data of the luminance blocks output from the calculator 85 are stored in the frame memory 86L. Then, the luminance signals are subjected to motion compensation in the motion compensating circuit 87L and are output to the calculator 85. On the contrary, the data of the color difference blocks are stored in the frame memory 86C. Then, the color difference data read out of the frame memory 86C are subjected to motion compensation in the motion compensating circuit 87C by using the motion vector which is ½ of the motion vector for use in the motion compensating circuit 87L in each of the vertical and horizontal directions, followed by outputting to the calculator 85.

As a result, the data of the macro block of 4:2:0 consisting of the four luminance blocks Y1 to Y4 and the color difference signal blocks Cb5" and Cr6" with the lowest definition are output from the circuit 161 to a select circuit 164.

On the other hand, the data of the color difference blocks, which are separated by the separating circuit 150 and have intermediate definition, are supplied to a variable-length decoding circuit 152 in a circuit 162 for variable-length decoding thereof and are inverse quantized by an inverse quantizing circuit 153. Then, those data are subjected to the IDCT process in an IDCT circuit 154 and thereafter applied to a calculator 155.

Also supplied to the calculator 155 are the data of the color difference blocks which are output from the calculator 85 in the circuit 161 and have lower definition after being up-sampled in the vertical direction by the up sampling circuit 151. In other words, those supplied data correspond to the predictive picture signals produced by the up sampling circuit 111 of the circuit 101 shown in FIG. 10. Therefore, by adding the data output from the IDCT circuit 154 and the predictive error signals output from the up sampling circuit 151 in the calculator 155, the color difference signal blocks Cb5', Cr6', Cb7', and Cr8' having intermediate definition are obtained. The resulting color difference signals are supplied to the select circuit 164.

Furthermore, the data of the color difference blocks Cb5, Cr6, Cb7, Cr8, Cb9, Cr10, Cb11, and Cr12, which are separated by the separating circuit 150 and have the highest definition, are supplied to a variable-length decoding circuit 157 in a circuit 163 for variable-length decoding thereof. The signals output from the variable-length decoding circuit 157 are inverse quantized by an inverse quantizing circuit 158, then subjected to the IDCT process in an IDCT circuit 159 and thereafter applied to a calculator 160.

Also supplied to the calculator 160 are the data of the color difference blocks, as predictive error signals, which are output from the calculator 155 in the circuit 162 and have intermediate definition after being up-sampled in the horizontal direction by the up sampling circuit 156. The calculator 160 adds those predictive error signals and the data output from the IDCT circuit 159, whereby the color difference signals Cb5, Cr6, Cb7, Cr8, Cb9, Cr10, Cb11, and Cr12 having the highest definition are decoded and output to the select circuit 164.

The select circuit 164 is included in the format conversion circuit 402 shown in FIG. 6. The select circuit 164 selects the luminance signals and also selects any one of the three groups of color difference signals having different definitions from each other in response to an instruction from the user. The luminance signals are supplied to the luminance signal frame memory 11, and the color difference signals are supplied to the color difference signal frame memory 403. The luminance signals read out of the luminance signal frame memory 11 are D/A-converted by the D/A converter 13 and then supplied to the post-processing circuit 15. The color difference signals read out of the color difference signal frame memory 403 are D/A-converted by the D/A converter 404 and then supplied to the post-processing circuit 15. The clock for the D/A converter 404 is changed depending on the selected group of color difference signals.

Accordingly, the user can select any desired one of three hierarchical definitions upon occasion and display the picture on a display or the like.

Figure 19:
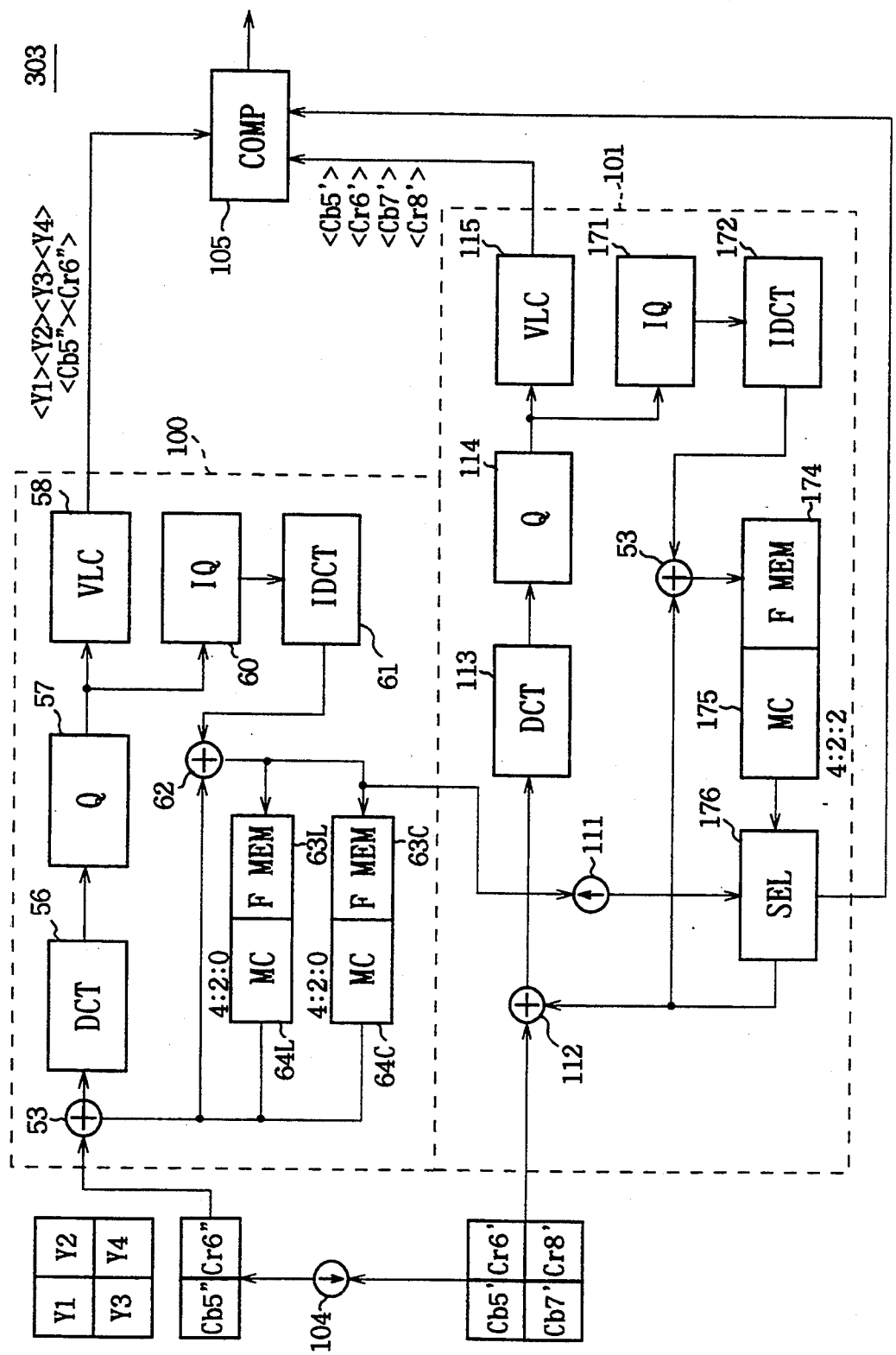
FIG. 19 is a block diagram of the configuration of a second embodiment of the encoder 303 of FIG. 6.

FIG. 19 shows a second embodiment of the encoder 303. In this embodiment, the circuit 102 used in the first embodiment (FIG. 10) for processing the color difference signals with the highest definition is omitted. Thus, the second embodiment has the circuit 101 for processing the color difference signals with intermediate definition, and the circuit 100 for processing the color difference signals with the lowest definition and the luminance signals. Of these two circuits, the circuit 100 is of the same configuration as that in the embodiment of FIG. 10.

On the other hand, the circuit 101 includes, in addition to the calculator 112, the DCT circuit 113, the quantizing circuit 114, and the variable-length coding circuit 115, an inverse quantizing circuit 171, an IDCT circuit 172, a calculator 173, a frame memory 174 for color difference signal, a motion compensating circuit 175, and a select circuit 176.

Thus, in this embodiment, the operation of the circuit 100 is similar to that in FIG. 10 and, therefore, will not be described here.

In the circuit 101, the manner of producing predictive picture signals is different from that in FIG. 10. More specifically, in this embodiment, the color difference signals output from the calculator 62 in the circuit 100 and locally decoded are up-sampled in the vertical direction by the up sampling circuit 111 to produce first predictive error signals, as with the embodiment of FIG. 10.

The signals output from the quantizing circuit 114 are inverse quantized by the inverse quantizing circuit 171, then subjected to the IDCT process in the IDCT circuit 172 and thereafter applied to the calculator 173. Also applied to the calculator 173 are the predictive error signals selected by the select circuit 176.

The calculator 173 adds the selected predictive error signals and the signals output from the IDCT circuit 172 for local decoding. The decoded color difference signals are supplied to and stored in the frame memory 174 for color difference signal. The color difference signals stored in the frame memory 174 are then subjected to motion compensation in the motion compensating circuit 175 by using the motion vector which is ½ of the motion vector for use in the motion compensating circuit 64L in the vertical direction, followed by supply as predictive picture signals to the select circuit 176.

The select circuit 176 compares the predictive error signals resulted when using the predictive picture signals output from the up sampling circuit 111 and the predictive error signals resulted when using the predictive picture signals output from the motion compensating circuit 175, and selects the predictive picture signals corresponding to the smaller predictive error signals. The selected predictive error signals are supplied to the calculator 173 for use in local decoding, as explained above, and also supplied to the calculator 112 for use as predictive error signals for encoding the color difference signals with intermediate definition supplied from the format conversion circuit 302.

Thus, in this embodiment, the circuit 101 produces the predictive picture having the same definition as the color difference signals having higher (intermediate) definition by causing the predictive picture decoded from the color difference signals having lower definition to pass through the up sampling circuit 111 (spatial filter) which is constituted by the interpolating circuit 141 (FIG. 14) or the like, and also produces the predictive picture by locally decoding the color difference signals having higher (intermediate) definition. Then, any one of those two predictive pictures which provides higher predictive efficiency is adaptively selected. As a result, data can be compressed with higher efficiency.

Further, in this embodiment, when the select circuit 176 selects any one of the predictive picture signals output from the up sampling circuit 111 and the predictive picture signals output from the motion compensating circuit 175, it outputs a space (in the case of selecting the former)/time (in the case of selecting the latter) flag indicating which one of the predictive picture signals is selected. The flag is composed with the data output from the circuits 100 and 101 in a multiplex manner by the composing circuit 105, followed by transmission.

Figure 20:
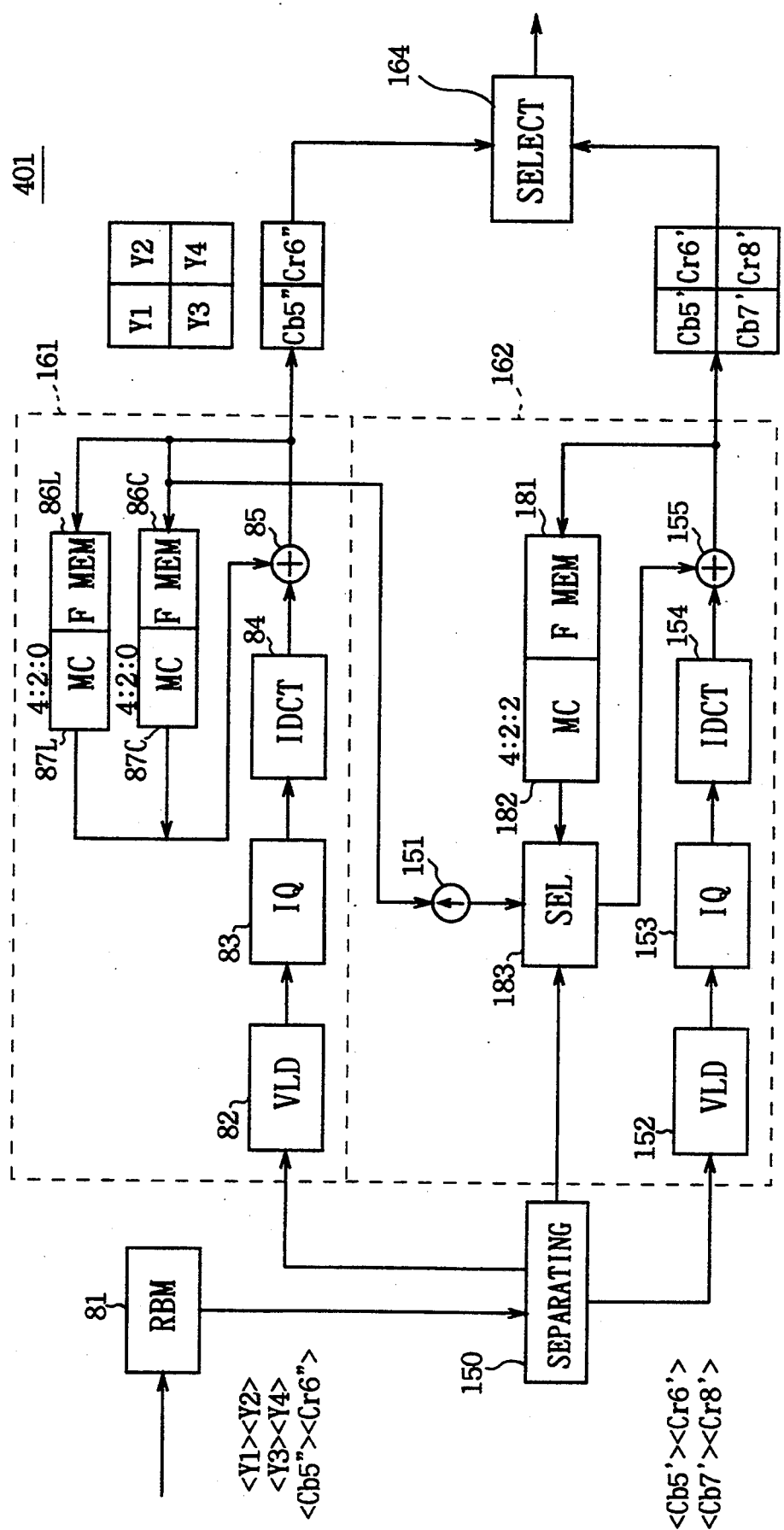
FIG. 20 is a block diagram of the configuration of a second embodiment of the decoder 401 of FIG. 6.

FIG. 20 shows an embodiment of the decoder 401 for decoding the data encoded by the encoder 303 shown in FIG. 19. In the embodiment of FIG. 20, those components corresponding to those in the embodiment of FIG. 17 are denoted by the same reference numerals. In this embodiment, the circuit 163 used in FIG. 17 for processing the color difference signals with the highest definition is omitted. Thus, the embodiment comprises the circuit 162 for processing the color difference signals with intermediate definition, and the circuit 161 for processing the color difference signals with the lowest definition and the luminance signals. Of these two circuits, the circuit 161 is of the same configuration as that in the embodiment of FIG. 17.

The circuit 162 includes, in addition to the up sampling circuit 151, the variable-length decoding circuit 152, the inverse quantizing circuit 153, the IDCT circuit 154, and the calculator 155, a frame memory 181, a motion compensating circuit 182, and a select circuit 183.

The decoded color difference signals output from the calculator 155 and having intermediate definition are supplied to and stored in the frame memory 181 for color difference signal. Those color difference signals are then subjected to motion compensation in the motion compensating circuit 182 by using the motion vector which is ½ of the motion vector for use in the motion compensating circuit 87C in the vertical direction, followed by supply as predictive picture signals in the direction of the time base to the select circuit 183.

Also supplied to the select circuit 183 are the predictive error signals obtained by up-sampling the color difference signals, which are output from the calculator 85 in the circuit 161 and have lower definition, in the vertical direction by the up sampling circuit 151, and expanding the lower definition to the same degree as that of the color difference signals having intermediate definition.

The separating circuit 150 detects the space/time flag from among the signals supplied from the receiving buffer 81 and outputs it to the select circuit 183. Upon the space flag being detected, the select circuit 183 selects the predictive error signals output from the up sampling circuit 151 and, upon the time flag being detected, it selects the predictive error signals output from the motion compensating circuit 182, followed by outputting to the calculator 155. As a result, the color difference signals having intermediate definition are adaptively decoded.

Figure 21:
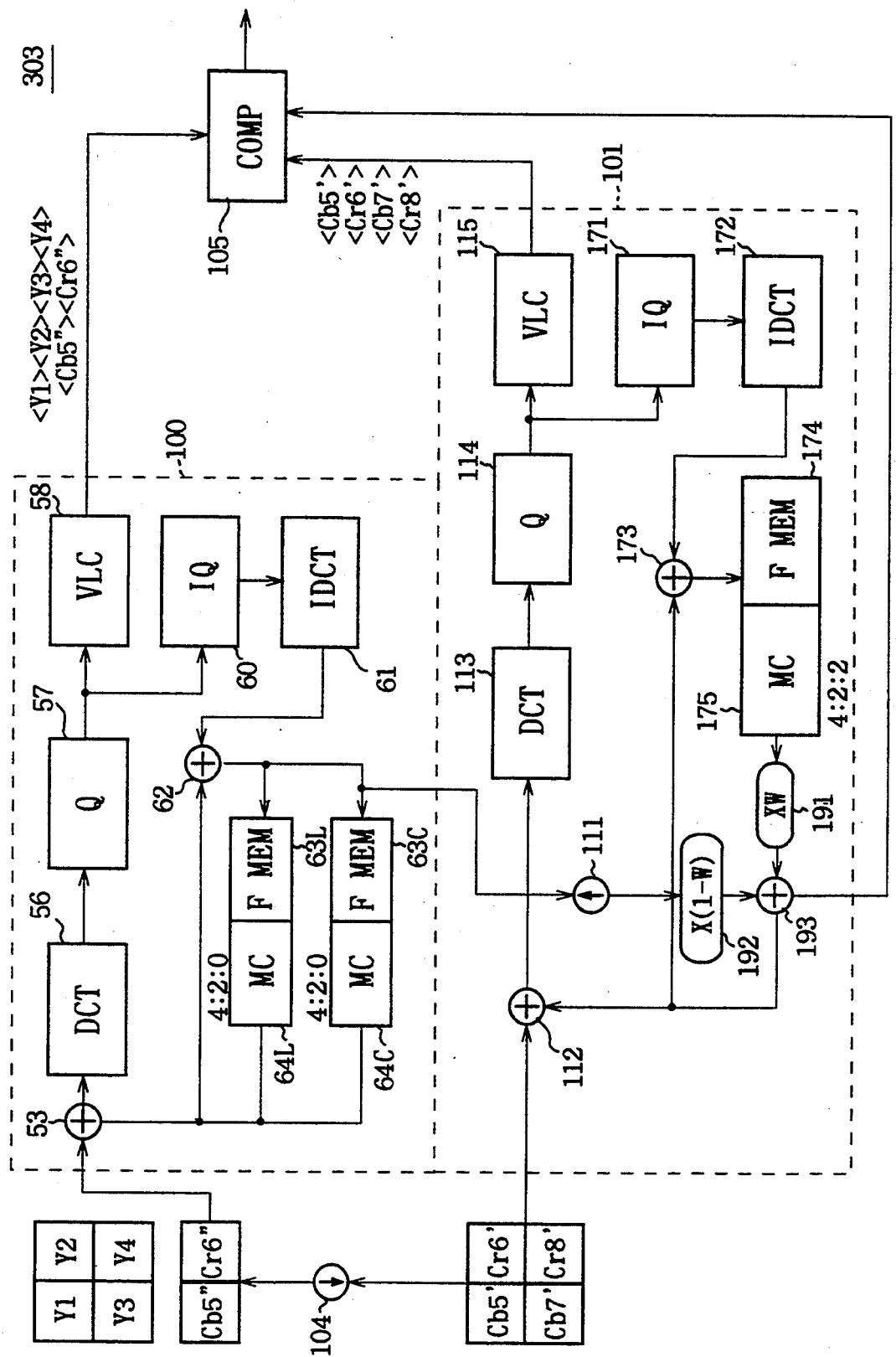
FIG. 21 is a block diagram of the configuration of a third embodiment of the encoder 303 of FIG. 6.

FIG. 21 shows a third embodiment of the encoder 303. In this embodiment, the circuit 101 has the configuration improved to some extent as compared with the circuit 101 of the second embodiment shown in FIG. 19. In the circuit 101, the predictive picture signals output from the motion compensating circuit 175 are multiplied by a weighting factor "W" in a weighting circuit 191 and then supplied to a calculator 193. Also, the predictive picture signals output from the up sampling circuit 111 are multiplied by a weighting factor (1-W) in a weighting circuit 192 and then supplied to the calculator 193. The calculator 193 adds the two sets of weighted predictive picture signals supplied from the weighting circuits 191 and 192.

Assuming, for example, that 0, ¼, 2/4, ¾, and 1 are set as weighting factors by the weighting circuit 191, the weighting circuit 192 sets the weighting factors of 1, ¾, 2/4, 14, and 0. Each of the weighting circuits 191 and 192 multiplies a set of predictive picture signals by five weighting factors, and outputs five sets of predictive picture signals to the calculator 193. The calculator 193 adds corresponding twos of the five sets of weighted predictive picture signals, thereby producing five sets of predictive picture signals. Then, five sets of predictive error signals resulted from adopting those five sets of predictive picture signals are produced, and the minimum set of predictive picture signals are selected as final predictive picture signals, followed by outputting to the calculators 112 and 173.

As a result, data can be compressed more efficiently.

Additionally, in this embodiment, the weighting factor W finally selected by the calculator 193 is output to the composing circuit 105. The composing circuit 105 composing the selected weighting factor W with the other color difference signals in a multiplex manner and outputs them.

Figure 22:
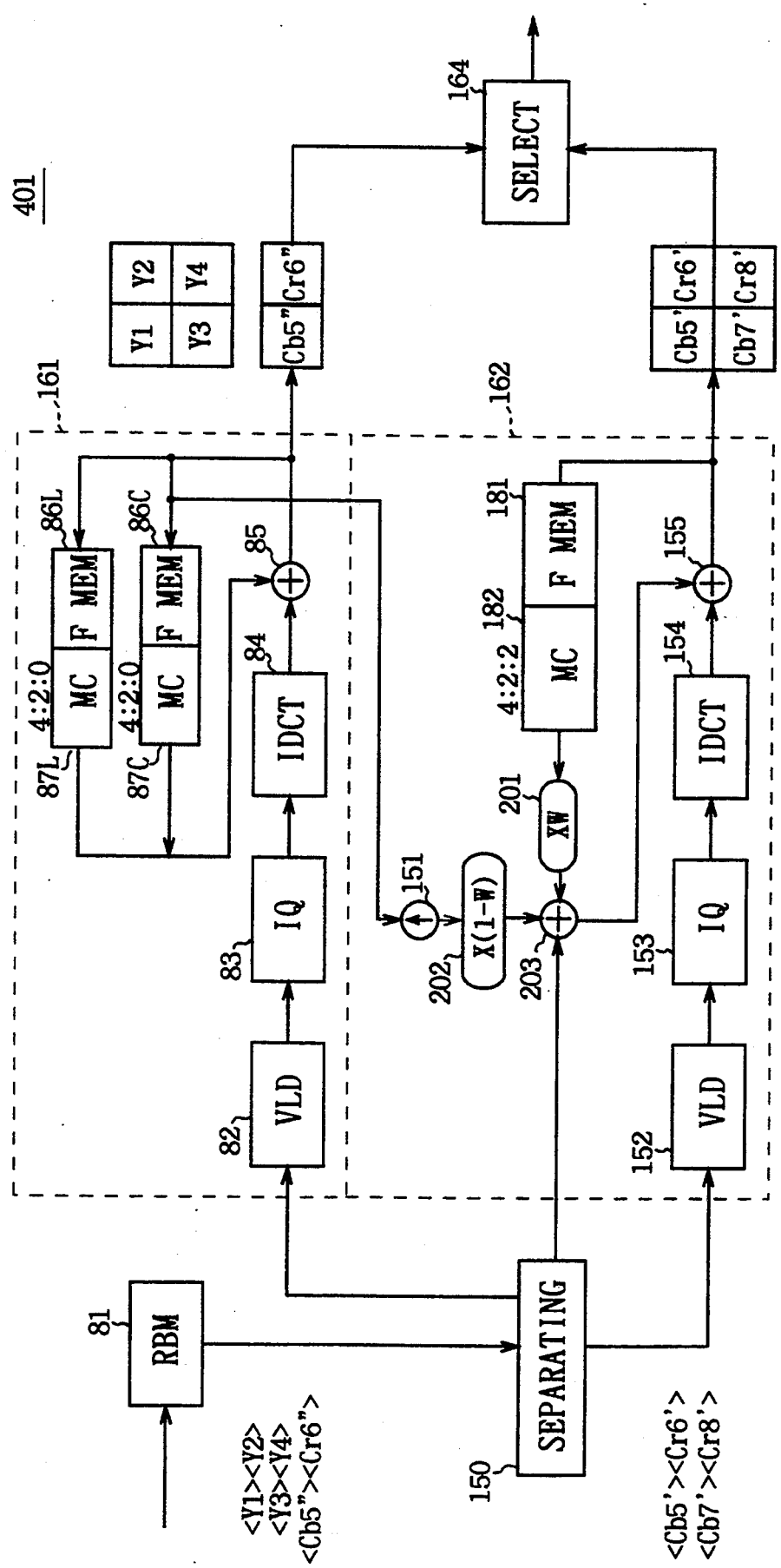
FIG. 22 is a block diagram of the configuration of a third embodiment of the decoder 401 of FIG. 6.

FIG. 22 shows an example of the configuration of the decoder 401 for decoding the signals encoded by the encoder 303 shown in FIG. 21. The embodiment of FIG. 22 is basically of the same configuration as the embodiment shown in FIG. 20 except that the circuit 162 in FIG. 20 is improved to some extent.

In the embodiment of FIG. 22, the predictive picture signals output from the motion compensating circuit 182 are multiplied by a weighting factor W in a weighting circuit 201 and then supplied to a calculator 203. Also, the predictive picture signals output from the up sampling circuit 151 are multiplied by a weighting factor (1- W) in a weighting circuit 202 and then supplied to the calculator 203. The weighting factor W for use in the weighting circuits 201 and 202 are set corresponding to the weighting factor for use in the weighting circuits 191 and 192 in FIG. 21.

Accordingly, the calculator 203 adds every corresponding twos of the five sets of weighted predictive picture signals supplied from the weighting circuit 201 and the five sets of weighted predictive picture signals supplied from the weighting circuit 202. Then, one of the five sets of added predictive picture signals which corresponds to the value of the weighting factor W separated by the separating circuit 150 from among the signals supplied from the receiving buffer 81, is selected. The selected predictive picture signals are input to the calculator 155 to be used as predictive picture signals for the color difference signals having intermediate definition.

In the above-explained embodiments, the band division using DCT is employed to carry out serial-parallel conversion of data in a block of n×n (n=8 in the embodiments) pixels. However, sub-band division using QMF, for example, can also be adopted. Alternatively, the present invention is further applicable to the case of using octave division by the waveled transform, or the case of encoding two-divisional input picture data after transforming or dividing the data in predetermined ways.

In addition, it is possible that a bit stream of encoded video signals are multiplexed with encoded audio signals and sync signals, added with error correction codes, and then subjected to predetermined modulation, the resulting modulated signal being used to modulate a laser beam to be recorded on a disc in the form of pits or marks. It is further possible to form a stamper by using the above disc as a master disc and mold a large number of reproduced discs (e.g., optical discs) from the stamper. In this case, a decoder reproduces data from the reproduced discs. Furthermore, encoded bit streams of the video signals may be transmitted through broadcasting radio wave, ISDN, or the like.

While specific embodiments of the invention have been shown and disclosed, it is to be understood that numerous changes and modifications may be made by those skilled in the art without departing from the scope and invent of the invention.

What is claimed is:

1. A picture signal encoding method, comprising the steps of:

providing a luminance signal and first and second color signals having respective first and second relative resolutions with respect to a resolution of said luminance signal, said first relative resolution being lower than said second relative resolution, and wherein said first and second color signals are of different color formats;

orthogonally transforming said luminance signal and said first color signal and producing a transformed luminance signal and a first transformed color signal;

variable-length encoding said transformed luminance signal and said first transformed color signal and producing an encoded luminance signal and a first encoded color signal; locally orthogonally inverse-transforming said first transformed color signal to produce a first inverse-transformed color signal;

up-sampling said first inverse-transformed color signal to produce a first up,sampled inverse-transformed color signal, said up-sampling exhibiting a ratio that is the same as the ratio of said first and second relative resolutions;

using said first up-sampled inverse-transformed color signal for orthogonally transforming said second color signal and producing a second transformed color signal; and variable-length encoding said second transformed color signal to produce a second encoded color signal.

2. A picture signal encoding method according to claim 1, wherein said first color signal and said luminance signal constitute a video signal of 4:2:0 format, and said second color signal and said luminance signal constitute a video signal of 4:2:2 format.

3. A picture signal encoding method according to claim 1, wherein said first color signal and said luminance signal constitute a video signal of 4:2:0 format, and said second color signal and said luminance signal constitute a video signal of 4:4:4 format.

4. A picture signal encoding method according to claim 1, wherein said first color signal and said luminance signal constitute a video signal of 4:2:2 format, and said second color signal and said luminance signal constitute a video signal of 4:4:4 format.

5. A picture signal encoding method according to claim 1, wherein said step of providing comprises the step of:

down-sampling said second color signal independently from said luminance signal to produce said first color signal.

6. A picture signal encoding method according to claim 1, further comprising the steps of:

motion compensation predictive encoding said first color signal by using a motion vector; and motion compensation predictive encoding said second color signal based on said motion vector.

7. A picture signal encoding method according to claim 1, wherein said step of encoding said second color signal includes the step of:

calculating the difference between said first up-sampled inverse-transformed color signal and said second color signal.

8. A picture signal decoding method, comprising the steps of:

receiving an encoded video signal comprising a luminance signal and first and second color signals which have been orthogonally transformed and variable-length encoded, said first color signal having a first relative resolution with respect to a resolution of said luminance signal and said second color signal having a second relative resolution which is higher than said first resolution, said first and second color signals being of different color formats;

variable-length decoding said first color signal and said luminance signal and producing a first variable-length decoded color signal and a variable-length decoded luminance signal;

inverse orthogonally-transforming said first variable-length decoded color signal and said variable-length decoded luminance signal and producing a first inverse-transformed color signal and an inverse-transformed luminance signal;

up-sampling said first inverse-transformed color signal to produce a first up-sampled inverse-transformed color signal;

variable-length decoding said second color signal and producing a second variable-length decoded color signal; and using said first up-sampled inverse-transformed color signal for inverse orthogonally-transforming said second variable-length decoded color signal and producing a second inverse-transformed color signal.

9. A picture signal decoding method according to claim 8, wherein said step of inverse orthogonally-transforming said second variable-length decoded color signal includes the step of:

adding said first up-sampled inverse-transformed color signal to said second inverse-transformed color signal.

10. A picture signal decoding method according to claim 8, wherein said luminance signal and said first color signal constitute a video signal of 4:2:0 format, and said luminance signal and said second color signal constitute a video signal of 4:2:2 format.

11. A picture signal decoding method according to claim 8, wherein said luminance signal and said first color signal constitute a video signal of 4:2:0 format, and said luminance signal and said second color signal constitute a video signal of 4:4:4 format.

12. A picture signal decoding method according to claim 8, wherein said luminance signal and said first color signal constitute a video signal of 4:2:2 format, and said luminance signal and said second color signal constitute a video signal of 4:4:4 format.

13. A picture signal encoding system, comprising:

means for providing a luminance signal and first and second color signals having respective first and second relative resolutions with respect to a resolution of said luminance signal, said first relative resolution being lower than said second relative resolution, and wherein said first and second color signals are of different color formats;

first transforming means for orthogonally transforming said luminance signal and said first color signal and for producing a transformed luminance signal and a first transformed color signal;

first variable-length encoding means for variable-length encoding said transformed luminance signal and said first transformed color signal and for producing an encoded luminance signal and a first encoded color signal;

inverse-transforming means for locally orthogonally inverse-transforming said first transformed color signal to produce a first inverse-transformed color signal;

up-sampling means for up-sampling said first inverse-transformed color signal to produce a first up-sampled inverse-transformed color signal, said up-sampling exhibiting a ratio that is the same as the ratio of said first and second relative resolutions;

second transforming means operative to use said first up-sampled inverse-transformed color signal, for orthogonally transforming said second color signal and for producing a second transformed color signal; and second variable-length encoding means for variable-length encoding said second transformed color signal to produce a second encoded color signal.

14. A picture signal encoding system according to claim 13, wherein said first color signal and said luminance signal constitute a video signal of 4:2:0 format, and said second color signal and said luminance signal constitute a video signal of 4:2:2 format.

15. A picture signal encoding system according to claim 13, wherein said first color signal and said luminance signal constitute a video signal of 4:2:0 format, and said second color signal and said luminance signal constitute a video signal of 4:4:4 format.

16. A picture signal encoding system according to claim 13, wherein said first color signal and said luminance signal constitute a video signal of 4:2:2 format, and said second color signal and said luminance signal constitute a video signal of 4:4:4 format.

17. A picture signal encoding system according to claim 13, further comprising:

down-sampling means for down-sampling said second color signal independently from said luminance signal to produce said first color signal.

18. A picture signal encoding system according to claim 13, further comprising:

encoding means responsive to a motion vector, for motion compensation predictive encoding said first color signal, said encoding means comprising:

predictive encoding means based on said motion vector, for motion compensation predictive encoding said second color signal 19. A picture signal encoding system according to claim 13, wherein said encoding means, further comprises:

means for calculating the differences between said first up-sampled inverse-transformed color signal and said second color signal.

20. A picture signal decoding system, comprising:

receiving means for receiving an encoded video signal comprising a luminance signal and first and second color signal which have been orthogonally transformed and variable-length encoded, said first color signal having a first relative resolution with respect to a resolution of said luminance signal and said second color signal having a second relative resolution which is higher than said first resolution, said first and second color signals being of different color formats;

first variable-length decoding means for variable-length decoding said first color signal and said luminance signal and for producing a first variable-length decoded color signal and a variable-length decoded luminance signal;

first inverse-transforming means for inverse orthogonally-transforming said first variable-length decoded color signal and said variable-length decoded luminance signal and for producing a first inverse-transformed color signal and an inverse-transformed luminance signal;

up-sampling means for up-sampling said first inverse-transformed color signal to produce a first up-sampled inverse-transformed color signal;

second variable-length decoding means for variable-length decoding said second color signal and for producing a second variable-length decoded color signal; and second inverse-transforming means operable with said first up-sampled inverse-transformed color signal for inverse orthogonally-transforming said second variable-length decoded color signal and for producing a second inverse-transformed color signal.

21. A picture signal decoding system according to claim 20, wherein said second inverse-transforming means comprises:

means for adding said first up-sampled inverse-transformed color signal to said second inverse-transformed color signal.

22. A picture signal decoding system according to claim 20, wherein said luminance signal and said first color signal constitute a video signal of 4:2:0 format, and said luminance signal and said second color signal constitute a video signal of 4:2:2 format.

23. A picture signal decoding system according to claim 20, wherein said luminance signal and said first color signal constitute a video signal of 4:2:0 format, and said luminance signal and said second color signal constitute a video signal of 4:4:4 format.

24. A picture signal decoding system according to claim 20, wherein, said luminance signal and said first color signal constitute a video signal of 4:2:2 format, and said luminance signal and said second color signal constitute a video signal of 4:4:4 format.

25. A picture signal recording medium having a picture signal recorded thereon by the method comprising the steps of:

providing a luminance signal and first and second color signals having respective first and second relative resolutions with respect to a resolution of said luminance signal, said first relative resolution being lower than said second relative resolution, and wherein said first and second color signals are of different color formats, orthogonally transforming said luminance signal and said first color signal and producing a transformed luminance signal and a first transformed color signal;

variable-length encoding said transformed luminance signal and said first transformed color signal and producing an encoded luminance signal and a first encoded color signal;

locally orthogonally inverse-transforming said first transformed color signal to produce a first inverse-transformed color signal;

up-sampling said first inverse-transformed color signal to produce a first up-sampled inverse-transformed color signal, said up-sampling exhibiting a ratio that is the same as the ratio of said first and second relative resolutions;

using said first up-sampled inverse-transformed color signal for orthogonally transforming said second color signal and producing a second transformed color signal;

variable-length encoding said second transformed color signal to produce a second encoded color signal;

recording said first encoded signal in the same group as said encoded luminance signal; and recording said second encoded signal in a group separated from said encoded luminance signal.

* * * * *